US012807264B2

(12) United States Patent
Hu et al.

(10) Patent No.: US 12,807,264 B2
(45) Date of Patent: Nov. 24, 2026

(54) ELECTRIC ALL-TERRAIN VEHICLE

(71) Applicant: Zhejiang CFMOTO Power Co., Ltd., Hangzhou (CN)

(72) Inventors: Xiayang Hu, Hangzhou (CN); Yunqiang Huang, Hangzhou (CN); Changjiang Li, Hangzhou (CN); Shixian Rui, Hangzhou (CN); Ruiqi Li, Hangzhou (CN); Wenshan Shen, Hangzhou (CN)

(73) Assignee: Zhejiang CFMOTO Power Co., Ltd., Hangzhou (CN)

( * ) Notice: Subject to any disclaimer, the term of this patent is extended or adjusted under 35 U.S.C. 154(b) by 251 days.

(21) Appl. No.: 18/783,646

(22) Filed: Jul. 25, 2024

(65) Prior Publication Data

US 2024/0383345 A1 Nov. 21, 2024

Related U.S. Application Data

(63) Continuation of application No. PCT/CN2023/072308, filed on Jan. 16, 2023.

(30) Foreign Application Priority Data

Jan. 25, 2022 (CN) ........................ 202210165678.X

(51) Int. Cl.

*B60K 1/04* (2019.01)
*B60K 17/16* (2006.01)

(Continued)

(52) U.S. Cl.

CPC .................. *B62K 5/01* (2013.01); *B60K 1/04* (2013.01); *B60K 17/16* (2013.01); *B60K 17/22* (2013.01);

(Continued)

(58) Field of Classification Search

CPC ....... B62K 5/01; B62K 2204/00; B60L 50/64; B60L 50/66; B62J 43/16; B60K 1/04;

(Continued)

(56) References Cited

U.S. PATENT DOCUMENTS 9,162,558 B2 * 10/2015 Stenberg ................. B60L 58/21
9,873,316 B2 1/2018 Lovold et al.

(Continued)

FOREIGN PATENT DOCUMENTS

CN 103625277 A 3/2014
CN 105000096 A 10/2015

(Continued)

*Primary Examiner* — Edwin A Young

(74) *Attorney, Agent, or Firm* — Shewchuk IP Services, LLC; Jeffrey D. Shewchuk

(57) ABSTRACT

An electric all-terrain vehicle includes a frame (11), a vehicle body cover (12), a set of wheels (13) a drive system (14), a motor control unit (15), a drive train (16), a battery pack (17), a steering assembly (18), and a suspension (19). The drive train includes a drive shaft (163) disposed between a front differential (161) and a rear differential (162). The drive shaft is at least partially disposed under the battery pack such that the drive shaft and the battery pack at least partially overlap in plan view, and a battery pack offset distance between the battery pack center of gravity and the transverse mid-plane is less than or equal to 300 mm.

20 Claims, 21 Drawing Sheets

(51) Int. Cl.

| | |
|---|---|
| ***B60K 17/22*** | (2006.01) |
| ***B60K 17/354*** | (2006.01) |
| ***B60K 17/356*** | (2006.01) |
| ***B60L 50/60*** | (2019.01) |
| ***B60L 50/64*** | (2019.01) |
| ***B62J 43/16*** | (2020.01) |
| ***B62K 5/01*** | (2013.01) |
| *B60K 17/04* | (2006.01) |

(52) U.S. Cl.
CPC .......... *B60K 17/354* (2013.01); *B60K 17/356* (2013.01); *B60L 50/64* (2019.02); *B60L 50/66* (2019.02); *B62J 43/16* (2020.02); *B60K 2001/0422* (2013.01); *B60K 17/04* (2013.01); *B62K 2204/00* (2013.01)

(58) Field of Classification Search
CPC ...... B60K 17/16; B60K 17/22; B60K 17/354; B60K 17/356; B60K 17/04; B60K 2001/0422; B60K 2001/0405
See application file for complete search history.

(56) References Cited

U.S. PATENT DOCUMENTS

| | | | | |
|---|---|---|---|---|
| 9,963,168 | B2 | 5/2018 | Suzuki | |
| 11,358,633 | B2 | 6/2022 | Davies et al. | |
| 2004/0084239 | A1 | 5/2004 | Hioki | |
| 2005/0224262 | A1 | 10/2005 | Ima et al. | |
| 2006/0207823 | A1 | 9/2006 | Okada et al. | |
| 2010/0194086 | A1 | 8/2010 | Yamamura et al. | |
| 2013/0233634 | A1 * | 9/2013 | Matsuda | B62J 43/28 180/220 |
| 2013/0270021 | A1 * | 10/2013 | Kubanek | B62J 43/20 180/220 |
| 2021/0354539 | A1 | 11/2021 | Miao | |

FOREIGN PATENT DOCUMENTS

| | | | |
|---|---|---|---|
| CN | 208664935 | U | 3/2019 |
| CN | 211364241 | U | 8/2020 |
| CN | 214776329 | U | 11/2021 |
| CN | 218229275 | U | 1/2023 |
| CN | 218229274 | U | 6/2023 |
| JP | 2012046077 | A | 3/2012 |

* cited by examiner

ELECTRIC ALL-TERRAIN VEHICLE

RELATED APPLICATION INFORMATION

The present application is a continuation of and claims the benefits of priority to International Application Number PCT/CN2023/072308, filed on Jan. 16, 2023, which is based upon and claims the benefits of priority to Chinese Patent Application No. 202210165678.X, filed with the Chinese Patent Office on Jan. 25, 2022. The entire contents of the above-referenced applications are incorporated herein by reference.

FIELD OF THE DISCLOSURE

The present disclosure relates to the field of vehicles, and particularly to an electric all-terrain vehicle.

BACKGROUND OF THE DISCLOSURE

All-terrain vehicles (ATVs) are designed for use on various types of rough terrain, able to drive freely on terrains that are difficult for ordinary vehicles to drive. Modern ATVs, also sometimes known as "All-terrain four-wheeled off-road locomotive" vehicles, are simple to use, practical, and have good off-road performance. An ATV can generate greater friction with the ground and reduce the pressure of the vehicle on the ground, thereby making it easy to drive on beaches, river beds, forest roads, streams, and harsh desert terrains. ATVs can be used to carry people or transport goods.

Under the call for energy conservation and emission reduction and associated trend of global electrification, the electrification of ATVs has become an unstoppable development force. However, electrification means that the ATV needs to be equipped with a battery pack to store locomotive energy for the ATV as well as a power electric drive motor, while being equipped with a traditional drive system from the electric drive motor to the wheels. The longer the range desired for the ATV, the more the volume and weight of the battery pack will increase accordingly. A heavy, large battery pack will unduly affect the driving performance and handling performance of the ATV especially if the battery pack is not reasonably positioned, which may increase the risk of the electric ATV overturning during driving.

SUMMARY OF THE INVENTION

An electric all-terrain vehicle is provided to solve at least one problem above.

In a first aspect, an electric all-terrain vehicle (ATV) includes a frame, a vehicle body cover, a drive system, a battery pack, a set of wheels and a drive train. The vehicle body cover covers at least part of the frame and has a straddle seat. The drive system has a motor supported by the frame. The battery pack provides energy for the motor for locomotion of the electric ATV. The set of wheels includes front wheels and rear wheels. The drive train has a front differential, a rear differential, and a drive shaft, and delivers torque from the motor to the set of wheels. The drive shaft is at least partially located under the battery pack. For front-to-back positioning, a battery pack offset distance between the battery pack center of gravity and the transverse mid-plane of the ATV is less than or equal to 300 mm.

In a second aspect, the battery pack of the electric ATV is located between the front differential and the rear differential. A left battery edge distance between the leftmost end of the battery pack and the longitudinal mid-plane is in the range from 30 mm to 165 mm, and a right battery edge distance between the rightmost end of the battery pack and the longitudinal mid-plane in the range from 30 mm to 165 mm.

In a third aspect, the frame of the electric ATV vehicle includes a front frame assembly detachably connected to a rear frame assembly with a battery pack receiving area defined between the front frame assembly and the rear frame assembly. The battery pack is positioned in the battery pack receiving area and has a battery case which can transfer forces between the front frame assembly and the rear frame assembly, and the front frame assembly and the rear frame assembly can be used with different lengths of battery packs.

The electric ATV can effectively improve vehicle range by reasonably arranging the location and arrangement of the battery pack. The internal layout of the electric all-terrain vehicle is compact, the center of gravity of the whole vehicle is reasonably disposed, and the drivability of the whole vehicle is improved.

For better understanding of the above objects, features and advantages of the present disclosure, the embodiments of the present disclosure will be described in detail below with reference to the accompanying drawings.

BRIEF DESCRIPTION OF THE DRAWINGS

The embodiments only represent several embodiments of the present invention, and the descriptions thereof are specific and detailed, but should not be construed as a limitation on the scope of the invention. In the figures.

DETAILED DESCRIPTION

Workers of ordinary skill in the art may make numerous modifications and improvements without departing from the concepts of the present invention. Therefore, the protection scope of the patent of the present invention is defined to include the full breadth of the appended claims.

Figure 1:
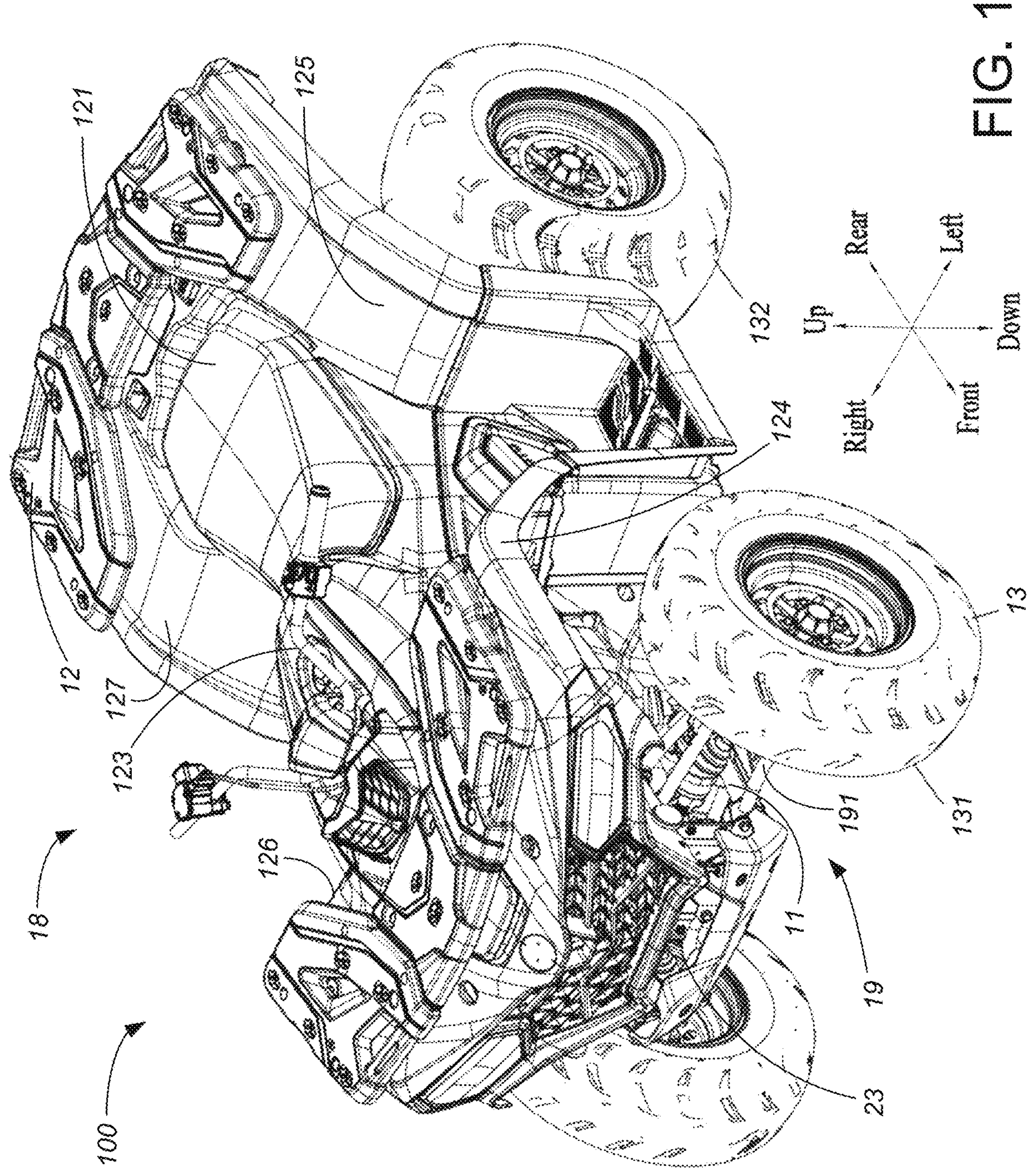
FIG. 1 is a front left perspective view of a preferred electric all-terrain vehicle ("ATV")

FIG. 1 shows a first preferred electric all-terrain vehicle (ATV) 100, which includes a frame 11, a vehicle cover 12 with a seat cushion 121 and an above-battery-pack storage box 123, a set of wheels 13, a steering assembly 18 and a suspension 19. The set of wheels 13 includes a pair of front wheels 131 and a pair of rear wheels 132. The general orientations of front, rear, up (upper), down (lower), left and right for the electric ATV 100 are defined in FIG. 1. The terms "up", "down" "vertical", "horizontal", etc. used herein assume the vehicle wheels are on a flat, horizontal surface, i.e., not on a slope, and with the wheel/tire sizes depicted. The pair of front wheels 131 are connected to the frame 11 through a front suspension 191, and the pair of rear wheels 132 are connected to the frame 11 through a rear suspension 192 (shown in FIG. 2). The steering assembly 18 is used to turn the front wheels 131.

Figure 2:
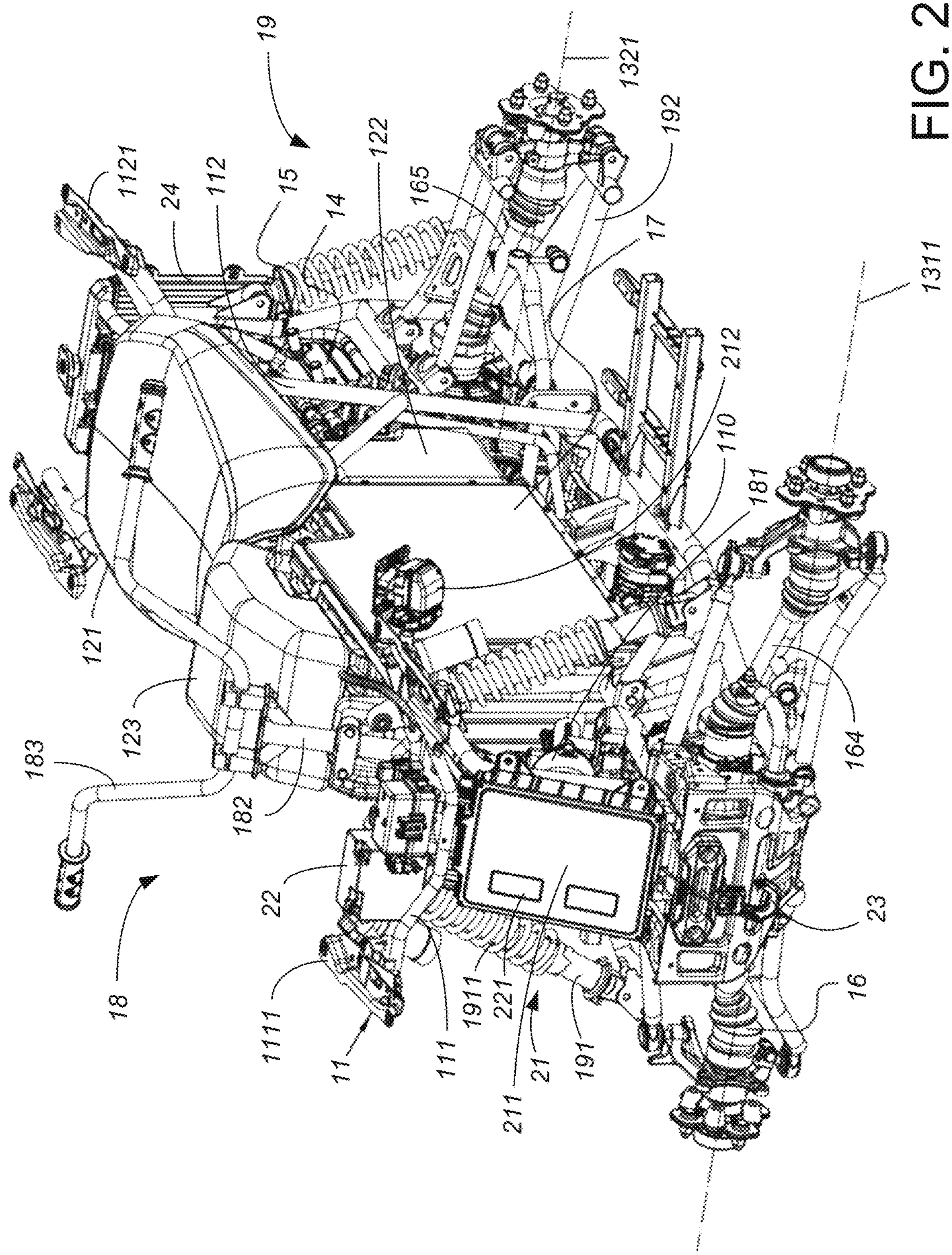
FIG. 2 is a front left perspective view of the electric ATV of FIG. 1 without showing the vehicle cover or the set of wheels.
Figure 3:
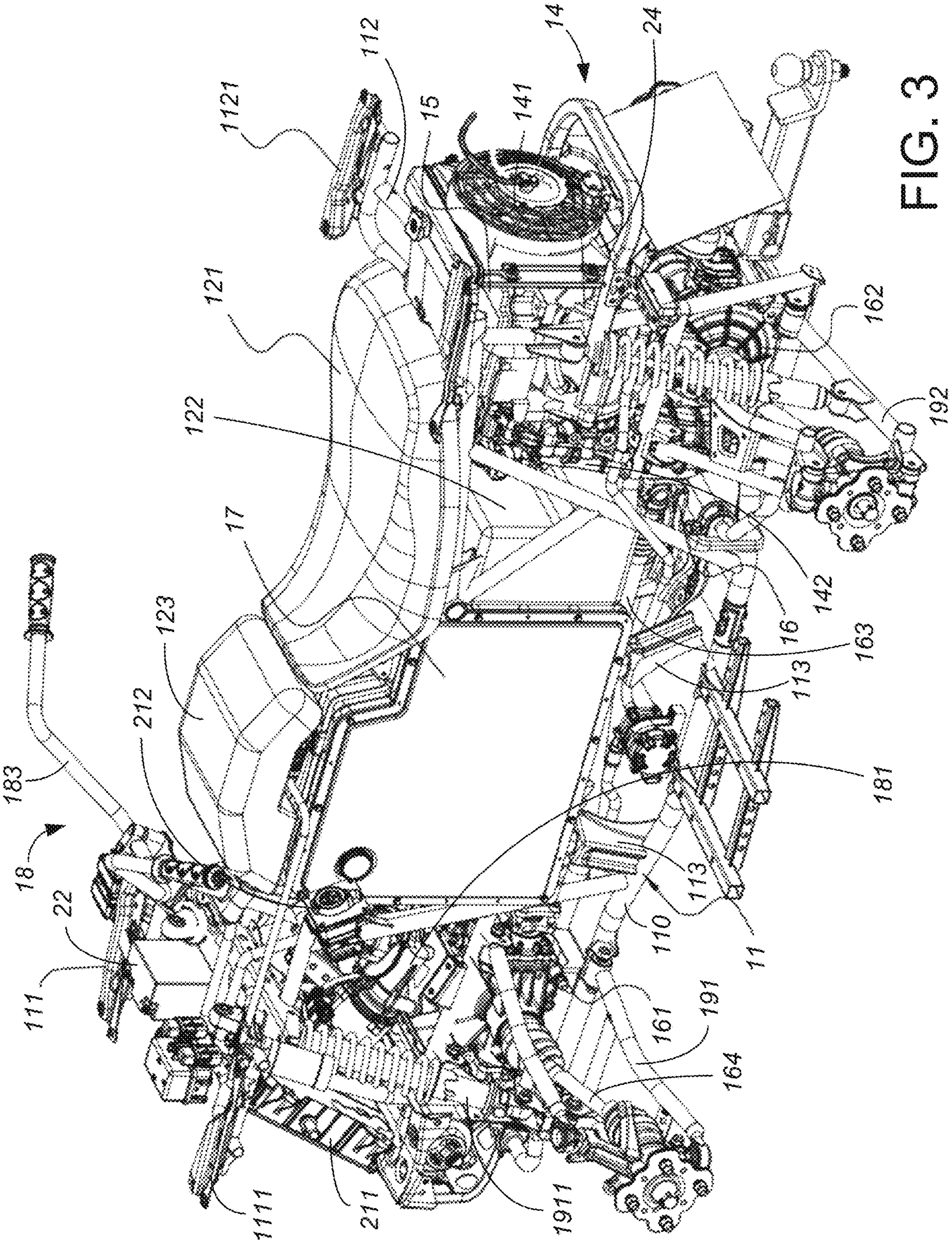
FIG. 3 is a rear left perspective view of the ATV portions shown in FIG. 2.
Figure 4:
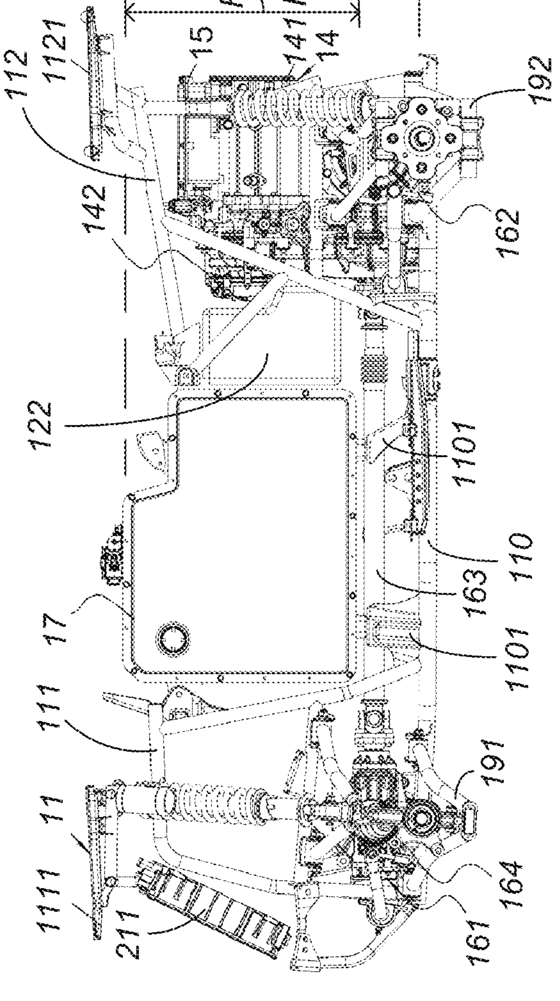
FIG. 4 is a left side view of the frame, Tri-core system, drive train and suspension of the ATV of FIGS. 1-3.
Figure 6:
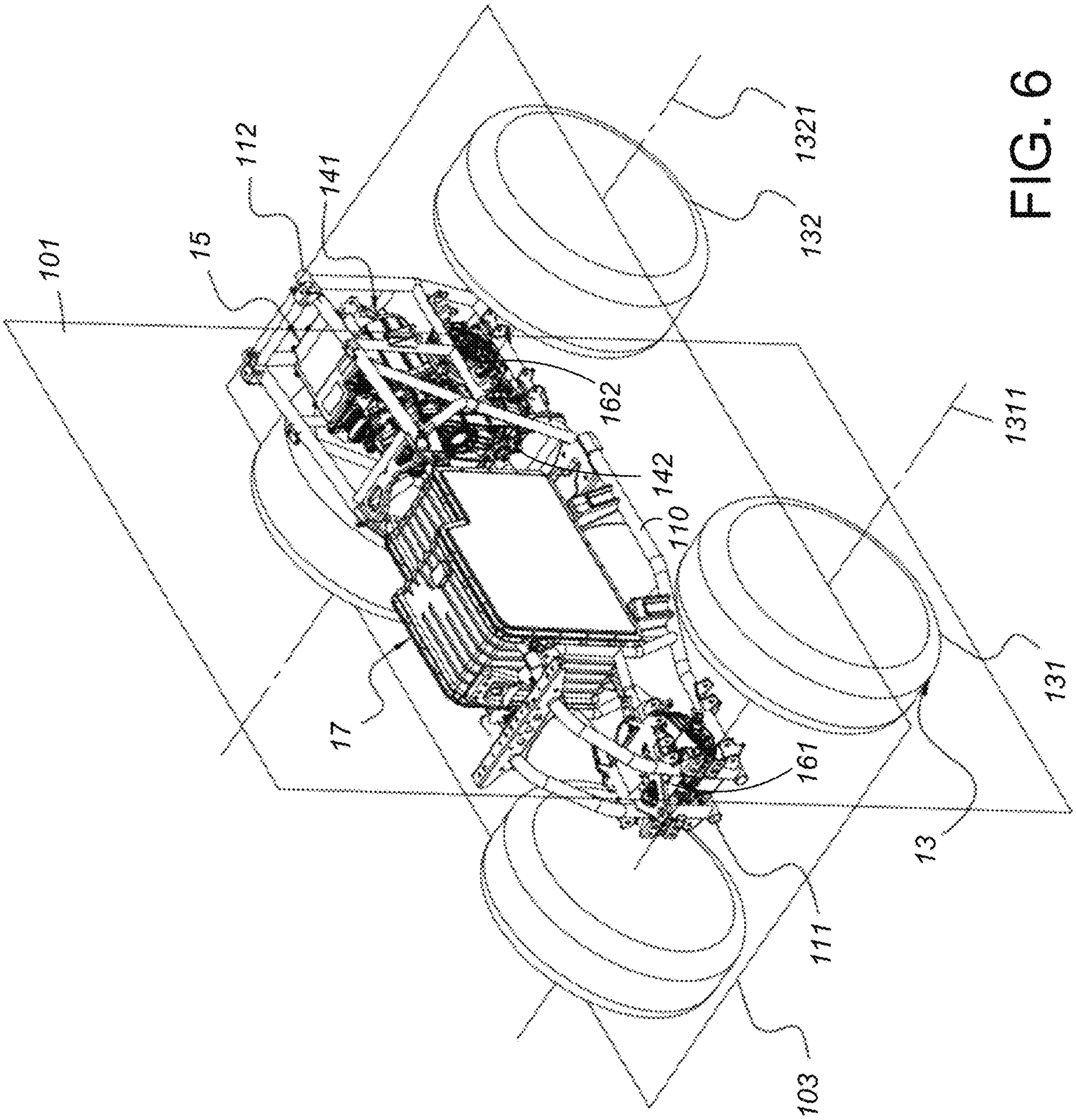
FIG. 6 is a front left perspective view of the Tri-core system and differentials of FIGS. 1-4, showing portions of the frame and schematically showing the set of wheels.

FIGS. 2 and 3 omit the vehicle cover 12 (other than the seat cushion 121, an under-seat storage box 122 and the above-battery-pack storage box 123) and the set of wheels 13 of the ATV 100, to better show the frame 11 as well as a drive system 14, an electronic motor control unit (MCU) 15, a drive train 16, a battery pack 17, and the front and rear suspensions 191, 192 of the ATV 100. FIG. 4 simplifies by omitting the seat cushion 121, the above-battery-pack storage box 122 and various other components. FIG. 6 further simplifies by showing only the drive system 14, the electronic motor control unit (MCU) 15, the drive train 16, and the battery pack 17 relative to only portions of the frame 11, showing schematic views of the set of wheels 13. The drive system 14, the MCU 15 and the drive train 16 are directly or indirectly mounted on the frame 11. The battery pack 17 is supported by the frame 11, preferably at a middle location where the battery pack 17 can be straddled by a rider sitting on the seat cushion 121. The drive system 14 includes an electric motor 141 and a gearbox assembly 142. The battery pack 17 is electrically connected to the electric motor 141 of the drive system 14 to provide electric energy for the electric motor 141. The gearbox assembly 142 connects an output shaft (not shown) of the electric motor 141 to the drive train 16. The vehicle cover 12 is at least partially mounted on the frame 11 to protect the drive system 14, the drive train 16, and the battery pack 17 as well as to make the ATV 100 more aesthetically appealing. The MCU 15 is electrically connected to the electric motor 141, and is primarily for controlling an operation status of electric motor 141. The drive train 16 delivers torque from the gearbox assembly 142 to the set of wheels 13.

The frame 11 includes a base 110, a first, front frame assembly 111 extending upwardly from the base 110 in front of the battery pack 17, and a second, rear frame assembly 112 extending upwardly from the base 110 behind the battery pack 17. The drive system 14 and the MCU 15 are preferably mounted to the rear frame assembly 112 rearward of the battery pack 17, and at least partially behind the battery pack 17. The drive train 16 includes a front differential 161, a rear differential 162 and a drive shaft 163 all called out in FIG. 3, as wells as through two front half shafts 164 and two rear half shafts 165 called out in FIG. 2. When the drive system 14 is mounted to the rear frame assembly 112, the drive shaft 163 delivers torque forwardly from the gearbox assembly 142 to the front differential 161, which drives the front wheels 131 through the front half shafts 164. The gearbox assembly 142 separately delivers torque to the rear differential 162 to drive the rear wheels 132 through the rear half shafts 165.

Figure 5:
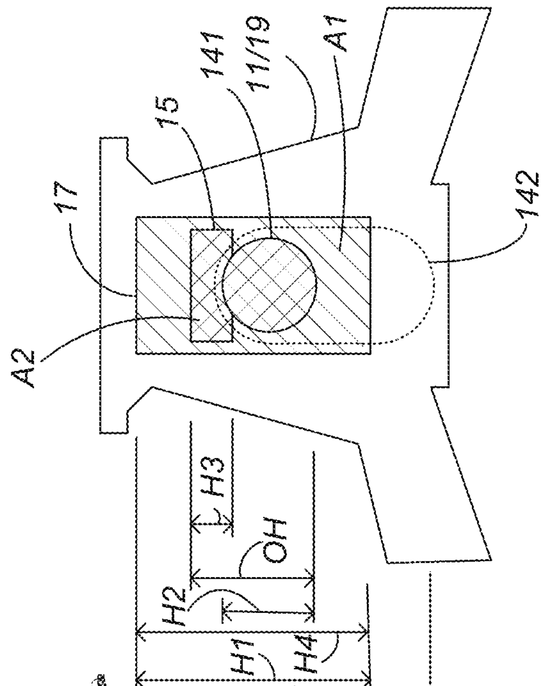
FIG. 5 is a schematic rear view of the Tri-core system of FIG. 4 relative to an outline of the frame and suspension.

The battery pack 17, the electric motor 141 and the MCU 15 are collectively referred to as the "Tri-core system" of the ATV 100. The side view of FIG. 4 and associated rear view of FIG. 5 call out several dimensions associated with the preferred Tri-core layout of the present invention. As shown in FIGS. 4 and 5, the battery pack 17 has a battery pack height H1, the drive system 14 has a motor height H2, the MCU 15 has an MCU height H3, and the overall Tri-core system has a Tri-core system height H4. At least two of the battery pack height H1, motor height H2 and MCU height H3 overlap in overlap heights OH. The ratio OH/H4 of the sum of overlap heights OH to the Tri-core system height H4 is in the range from 0.4 to 1.0, with a preferred value of about 0.7. Similarly, the rear view of FIG. 5 effectively shows projections of the battery pack 17, the MCU 15 and the electric motor 141 on a vertical transverse plane perpendicular to the longitudinal direction. The three projections collectively define a Tri-core system projection area A1 (any of the cross-hatching), and any two or more of the projections which overlap define a projection overlap area A2 (with an "X" cross-hatch pattern). A ratio A2/A1 of the projection overlap area A2 to the Tri-core system projection area A1 to is preferably in the range from 0.4 to 1.0, with a preferred value of about 0.7.

Locating the MCU 15 over the electric motor 141 allows for an accommodation space to be defined between the drive system 14 and the battery pack 17. The under-seat storage box 122 may be arranged in this accommodation space such as at least partially above the drive shaft 163, which further increases the storage space of the electric ATV 100. The under-seat storage box 122 has an opening 1221 on its top, which is closed off by the seat cushion 121. The user can access the under-seat storage box 122 simply by pivoting or otherwise moving the seat cushion 121 on the ATV 100. Using the seat cushion 121 as the lid of the under-seat storage box 122 reduces the number parts of the electric ATV 100, integrates the functions of multiple parts, reduces the weight of the whole vehicle 100, and simplifies the assembly process.

Figure 7:
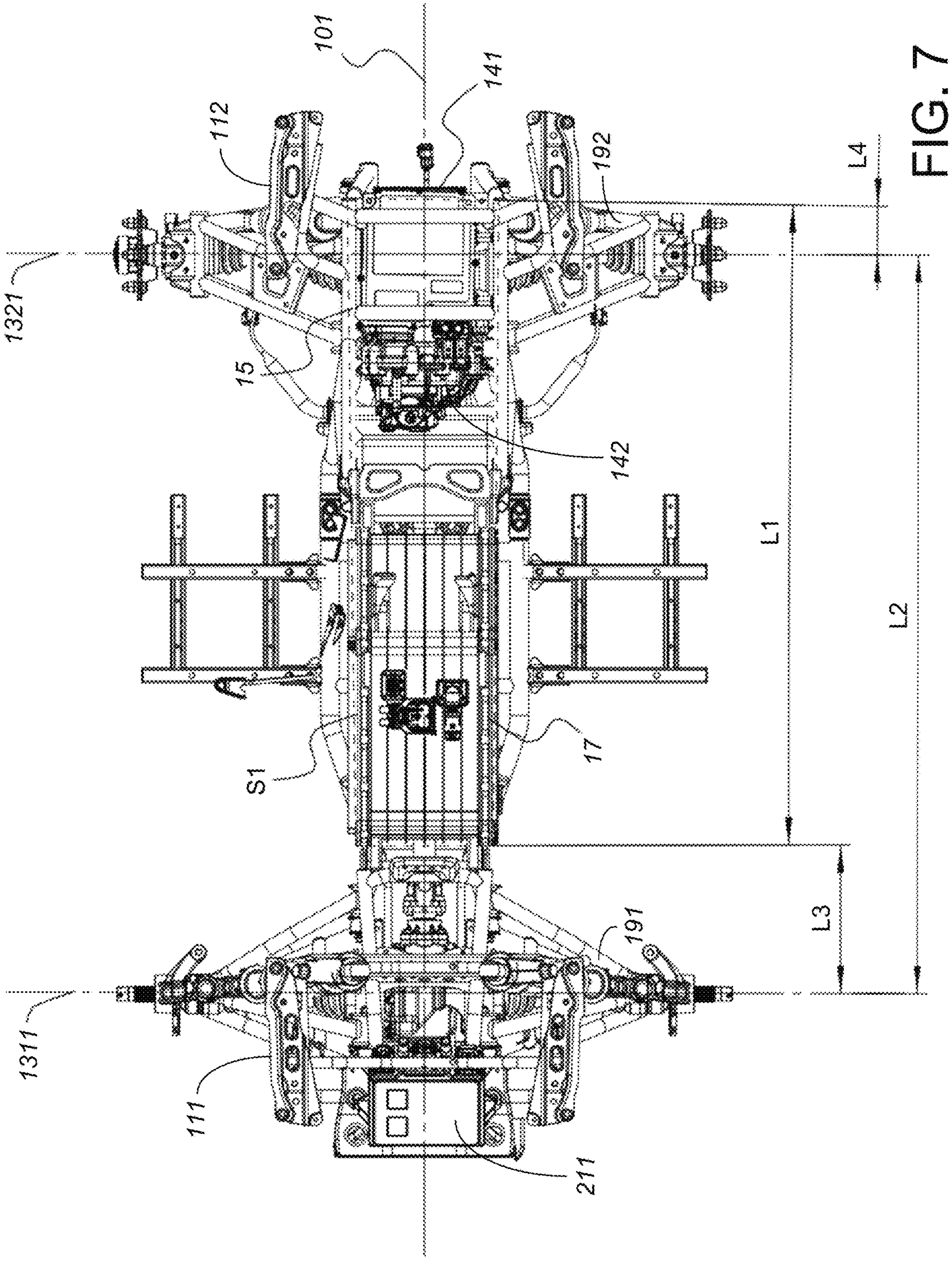
FIG. 7 is a top plan view of the frame, Tri-core system, drive train and suspension of FIG. 4.

The plan view of FIG. 7 calls out several further dimensions associated with the preferred Tri-core layout of the present invention. A front wheel axis 1311 is defined as a straight line connecting the two rotation center points of the two front wheels 131, and a rear wheel axis 1321 is defined as a straight line connecting the two rotation center points of the two rear wheels 132. A Tri-core system projection area S1 is defined as the combined projections of the MCU 15, electric motor 141 and battery pack 17 all on a horizontal plane as viewed in FIG. 7. A maximum longitudinal length occupied by the Tri-core system projection area S1 is defined as a Tri-core length L1. In the preferred layout, the MCU 15 is at least partially positioned above the electric motor 141, which can shorten the Tri-core length L1. The electric motor 141 and the MCU 15 are preferably directly mounted on the rear frame assembly 112, but an alternative embodiment mounts the MCU 15 directly on the electric motor 141, which can make the connection between the electric motor 141 and the MCU 15 closer, save assembly space of the electric ATV 100, and further reduce the length of wire harness connections between various electrical components, thereby reducing assembly costs and material costs.

A horizontal longitudinal length between the front wheel axis 1311 and the rear wheel axis 1321 is defined as a wheelbase distance L2. A ratio L2/L1 of the wheelbase distance L2 to the Tri-core length L1 is preferably in the range from 0.7 to 2.5, more preferably in the range from 0.9 to 2.0, and most preferably in the range from 1.1 to 1.6. This allows the weights of the MCU 15, the electric motor 141, and the battery pack 17 of the electric ATV 100 to be evenly distributed along the length of the electric ATV 100, which is conducive to the reasonable distribution of the center of gravity of the electric ATV 100. A longitudinal mid-plane 101 is defined perpendicular to a left-right direction of the electric ATV 100, and the electric ATV 100 is substantially symmetrical with respect to the longitudinal mid-plane 101. The longitudinal mid-plane 101 at least partially intersects with the Tri-core system projection area S1. Preferably, the Tri-core system projection area S1 is substantially symmetrical with respect to the longitudinal mid-plane 101, with the weight and volume distribution of each of the battery pack 17, the electric motor 141, and the MCU 15 of the electric ATV 100 being substantially evenly distributed on the left and right sides of the electric ATV 100. This contributes to locating the center of gravity of the electric ATV 100 substantially at the center position of the electric ATV 100, thereby making the electric ATV 100 more stable during running.

A longitudinal length from the front edge of the Tri-core system projection area S1 to the front wheel axis 1311 is defined as a Tri-core front distance L3. The Tri-core front distance L3 is preferably in the range from 0 mm to 1500 mm, more preferably the range from 100 mm to 1000 mm, and most preferably in the range from 200 mm to 500 mm. A longitudinal length from the rear edge of the Tri-core system projection area S1 to the rear wheel axis 1321 is defined as a Tri-core rear distance L4. The Tri-core rear distance L4 is preferably in the range from 0 mm to 1500 mm, more preferably in the range from 0 mm to 1000 mm, and most preferably in the range from 0 mm to 500 mm. Appropriate selections of values for the Tri-core front distance L3 and the Tri-core rear distance L4 helps position the battery pack 17, the electric motor 141, and the MCU 15 so the center of gravity of the ATV 100 is not too far forward or backward, ensuring the stability and handling of the electric ATV 100.

Figure 8:
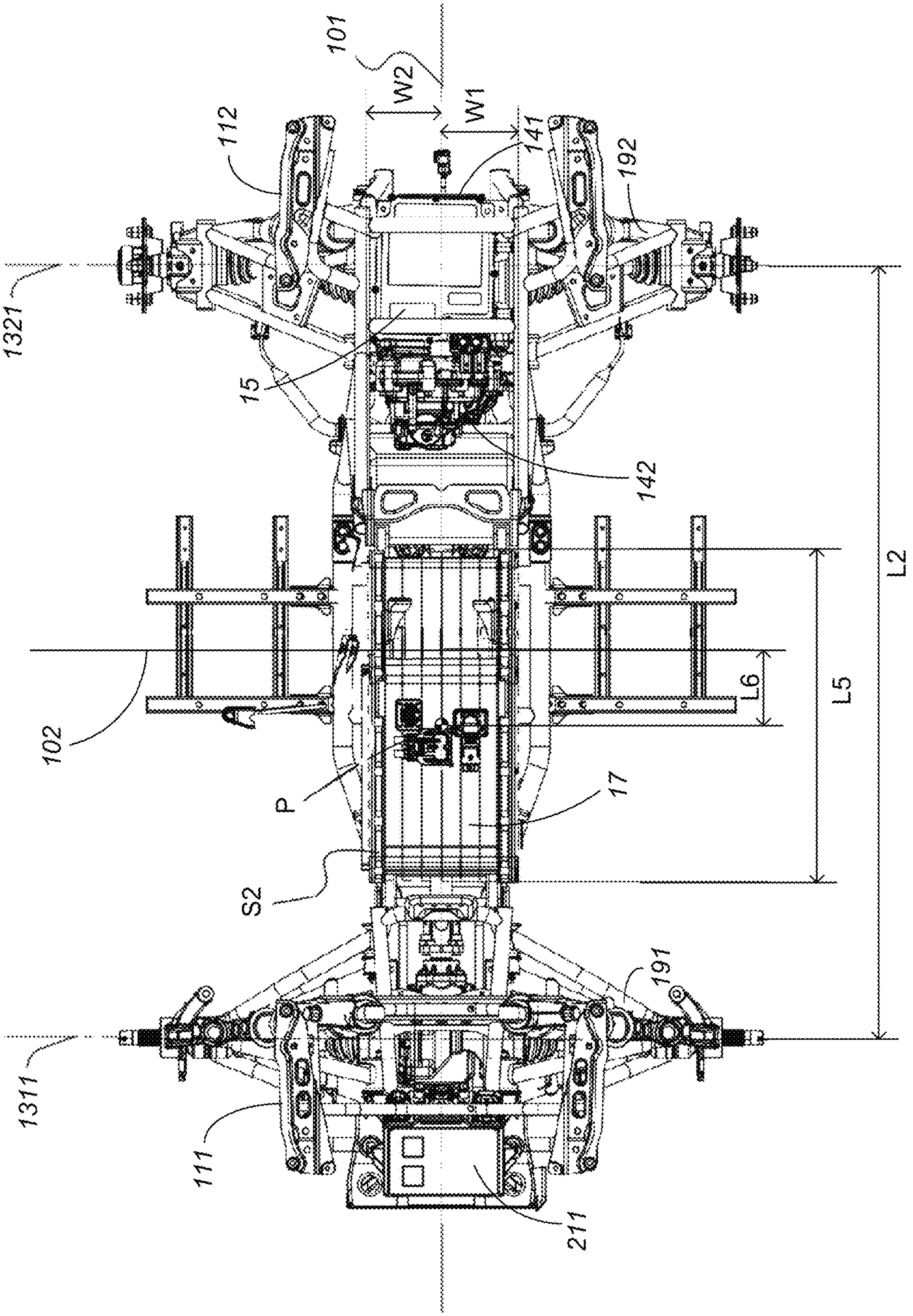
FIG. 8 is the top plan view of FIG. 7, calling out other dimensions.

As shown in FIG. 8, the electric ATV 100 includes a transverse mid-plane 102 perpendicular to the front-rear direction of the electric ATV 100, half way between the front wheel axis 1311 and the rear wheel axis 1321. In a horizontal projection plane, the battery pack 17 forms a battery pack projection area S2. The maximum length of the battery pack projection area S2 in the front-rear direction of the electric ATV 100 is defined as a battery pack length L5. A battery pack length ratio L5/L2 between the battery pack length L5 and the wheelbase distance L2 is preferably in the range from 0.1 to 0.6. This preferred value range for the battery pack length ratio L5/L2 keeps the longitudinal length of the battery pack 17 appropriate and avoids the need for a longer or larger frame in order to accommodate the battery pack, thereby effectively reducing the overall length of the frame 11. Reasonably setting the length of the battery pack 17 can effectively improve the compactness of the arrangement of the Tri-core system of the electric ATV 100. The center of gravity of the electric ATV 100 is reasonably disposed to ensure that the stability of the electric ATV 100 is not adversely affected by the battery pack 17.

The battery pack 17 is supported by the frame 11 and positioned in the middle of the frame 11 such that the transverse mid-plane 102 passes through the battery pack 17. A battery pack offset distance L6 between the center of gravity P of the battery pack 17 and the transverse mid-plane 102 is preferably less than or equal to 1000 mm, more preferably less than or equal to 600 mm, and most preferably less than or equal to 300 mm. It should be noted that the battery pack 17 can be disposed with its center of gravity P forward of the transverse mid-plane 102 or rearward of the transverse mid-plane 102. In an alternative embodiment having the drive system of the electric ATV disposed on the front frame assembly resulting in a heavier weight of the front end of the electric ATV, the battery pack can be moved rearwardly so its center of gravity better balances the weight of the electric ATV. The battery pack 17 is relatively bulky in terms of volume and mass relative to the drive system 14 and the MCU 15, and the position of the battery pack 17 can have a great impact on the center of gravity of the electric ATV 100. An appropriate position locates the battery pack 17 substantially in the middle of the electric ATV 100 to improve the stability of the electric ATV 100. The preferred arrangement keeps the center of gravity of the electric ATV 100 from being too forward or backward, keeping the electric ATV 100 from flipping forward or backward under extreme working conditions. As an ideal arrangement, the center of gravity P of the battery pack 17 is positioned on the transverse mid-plane 102, that is, the distance between the center of gravity P of the battery pack 17 and the transverse mid-plane 102 is 0. In this ideal arrangement, the electric ATV 100 is in the most stable state against roll-over in the front-back direction.

As shown in FIG. 8, a left battery edge distance W1 is defined between the leftmost end of the battery projection area S2 and the longitudinal mid-plane 101, and a right battery edge distance W2 is similarly defined between the rightmost end of the battery projection area S2 and the longitudinal mid-plane 101. Both the left battery edge distance W1 and the right battery edge distance W2 are preferably in the range from 0 mm to 180 mm, more preferably in the range from 30 mm to 165 mm, and most preferably in the range from 60 mm to 150 mm. The left and right battery edge distances W1, W2 will affect the width of the electric ATV 100 to a certain extent. A larger battery pack 17 can obtain longer battery life, but for a given battery pack length L5, the arrangement of the battery pack 17 in the vehicle width direction also affects the position of the center of gravity and the width of the electric ATV 100. Proper selections of left and right battery edge distances W1, W2 effectively restrict the vehicle's width to ensure the driver's comfortable riding posture, and prevent one side of the electric ATV 100 from being too wide to affect the layout of the drive system 14 and the MCU 15 in the vehicle 100.

Further, a battery edge ratio W1/W2 of the left battery edge distance W1 to the right battery edge distance W2 is preferably in the range from 0.2 to 5, more preferably in the range from 0.8 to 1.25, and most preferably has a value of about 1. As an ideal state, if the components of the battery pack 17 are evenly distributed, the center of gravity P of the battery pack 17 is disposed on the longitudinal mid-plane 101 and the battery edge ratio W1/W2 is 1. The appropriate battery edge ratio W1/W2 limits the lateral distribution of the battery pack 17 on the electric ATV 100. It should be noted that based on the vehicle layout requirements of the electric ATV, the battery pack 17 can be disposed on the left side or the right side of the electric ATV, thus it is convenient for some components to be disposed on the other side of the electric ATV 100. However, if the battery pack 17 is too far shifted to one side, it may cause the electric ATV 100 to roll over during a sharp turn. Therefore, the position of the battery pack 17 on the electric ATV 100 should be reasonably limited.

Figure 9:
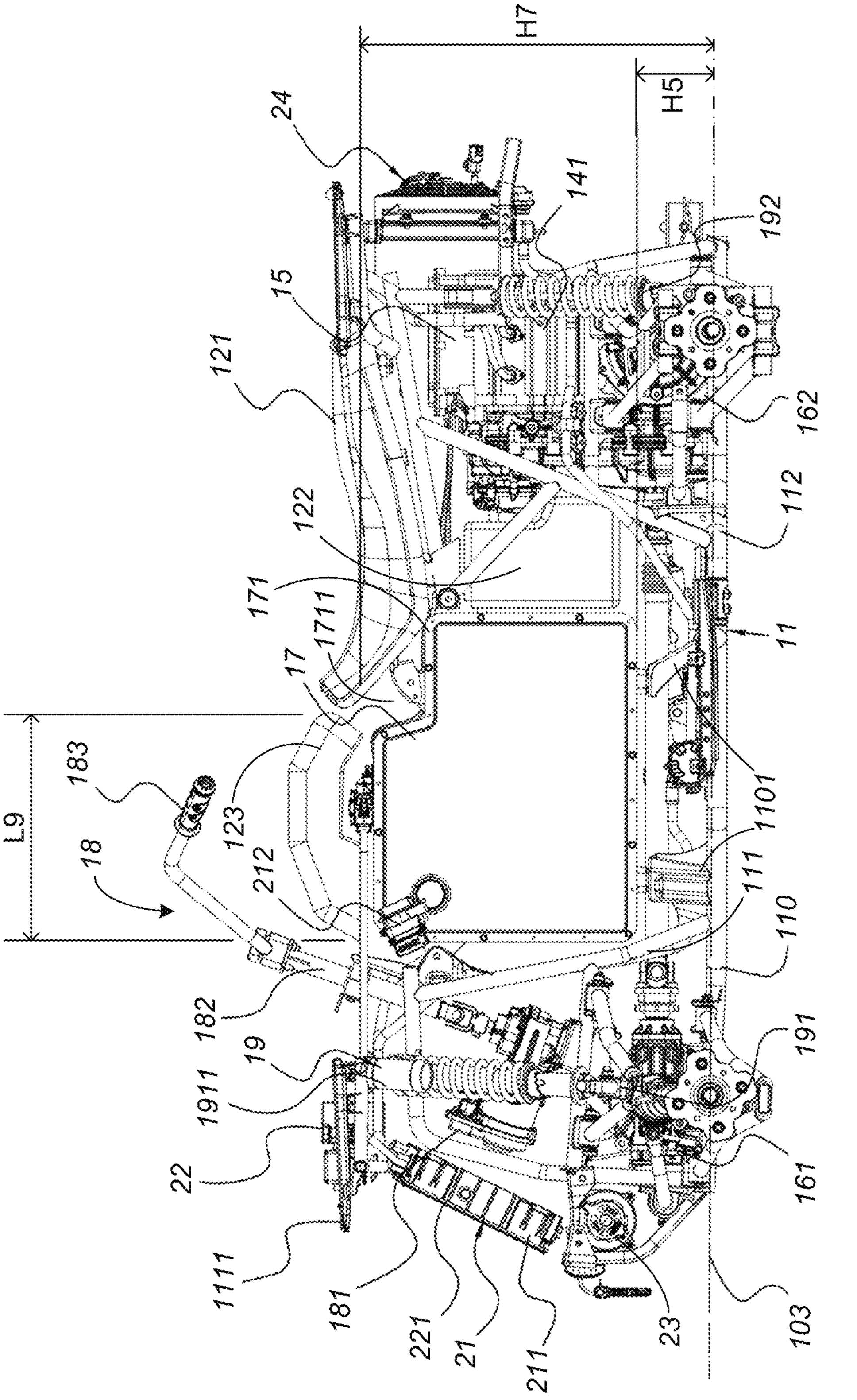
FIG. 9 is a left side view of the electric ATV of FIG. 1 without showing the vehicle cover other than the straddle seat and without showing the set of wheels.

As shown in FIGS. 2, 3 and 9, the steering assembly 18 of the electric ATV 100 includes a power steering assist module 181, a steering column 182 and handlebars 183. The steering assembly 18 is supported by the frame 11 to allow turning of the front wheels 131. The steering assembly 18 is at least partially disposed forward of the battery pack 17. Further, the steering assembly 18 is also at least partially disposed above the battery pack 17, such that when viewed from above, the battery pack 17 and the handlebars 183 at least partially overlap. In side view, two shock absorbers 1911 of the front suspension 191 are disposed to at least partially overlap with the power steering assist module 181.

As shown in FIG. 9, a lowermost end of the battery pack 17 is disposed on the frame 11 just above the base 110 and supported by standoffs 1101. The frame 11 supports and restricts the position of the battery pack 17 for best cooperation with other parts of the electric ATV 100. A wheel axis plane 103 is defined as a plane containing the front wheel axis 1311 and the rear wheel axis 1321. A battery standoff distance H5 between the lowermost end of the battery pack 17 and the wheel axis plane 103 is preferably in the range from about 0 mm to about 370 mm, more preferably in the range from about 0 mm to 250 mm, and most preferably in the range from about 0 mm to 100 mm. The smaller the battery standoff distance H5, the more vertical space available for the battery pack 17, and the lower the center of gravity P of the battery pack 17 making operation of electric ATV 100 more stable. However, too small of a value for the battery standoff distance H5 will reduce the potential wading depth of the electric ATV 100 across puddles, ponds or streams, thus decreasing passability of the electric ATV 100. Therefore, setting the battery standoff distance H5 within a reasonable range can enable the electric ATV 100 to have a better wading depth while optimizing the distribution of the center of gravity of the electric ATV 100.

In order to protect the safety of the battery pack 17 during driving of the electric ATV 100, a protective fence (not shown) can be added at the front end of the battery pack 17. The protective fence may be a sheet metal part or a tubular metal part, and may be disposed on the battery pack 17 or the frame 11. So as to effectively protect the battery pack 17, the position of the protective fence should be lower than the battery pack 17 or at the same height as the battery pack 17.

The battery pack 17 includes a battery case 171 which is at least partially disposed under the seat cushion 121, i.e., when viewed from above, the seat cushion 121 and the battery pack 17 at least partially overlap. Specifically, at least 15% of the seat cushion 121 overlaps the battery pack 17. In order to prevent the battery pack 17 from interfering with the seat cushion 121, the battery case 171 defines a battery case recess 1711.

The Tri-core projection area S1 formed by the battery pack 17, the motor 141, and the MCU 15 only refers to the projection formed by bodies of the motor 141, the MCU 15, and the battery pack 17 on a specific projection surface. The projection surface or projection area of the wiring harness and other corresponding connecting components connected to the motor 141, the MCU 15 and the battery pack 17 are not included. The same holds true for the battery pack projection area S2.

Figure 10:
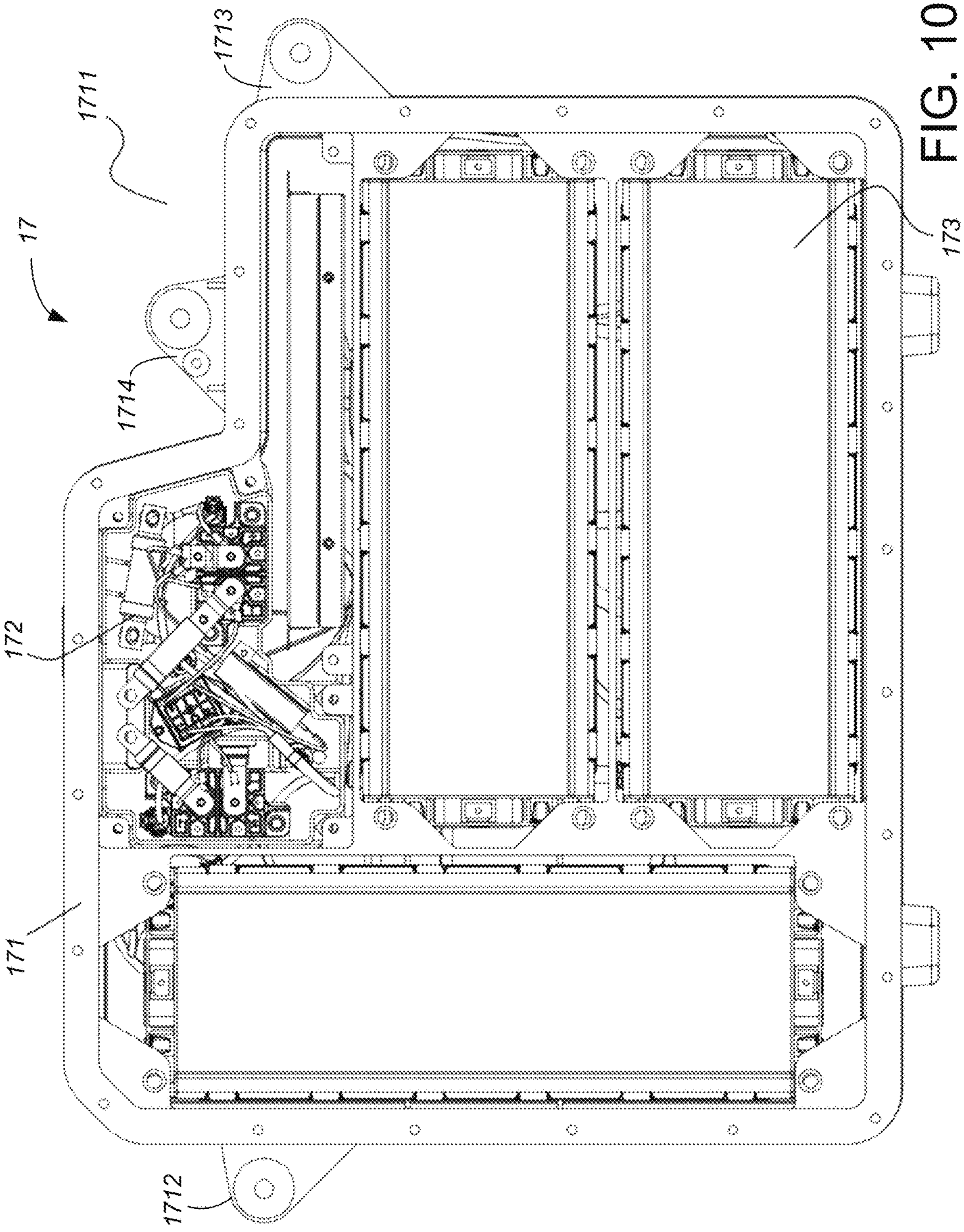
FIG. 10 is an interior view of the battery pack of the electric ATV.

As shown in FIG. 10, the battery pack 17 includes a battery controller 172 and a plurality of battery modules 173 distributed along the front-rear direction of the electric ATV 100 within the battery case 171. The internal battery modules 173 of the battery pack 17 and the battery controller 172 are arranged reasonably so as to enable the battery case recess 1711 to be formed on the upper rear end of the battery pack 17. Specifically the preferred battery pack 17 includes three battery modules 173, two with their longest sides extending longitudinally and one with its longest side extending vertically. The battery controller 172 is disposed above the front ends of the two longitudinally extending battery modules 173. This arrangement effectively utilizes the space within the battery case 171, improving the compactness of the battery pack 17 and arrangement of the electric ATV 100.

Figure 11:
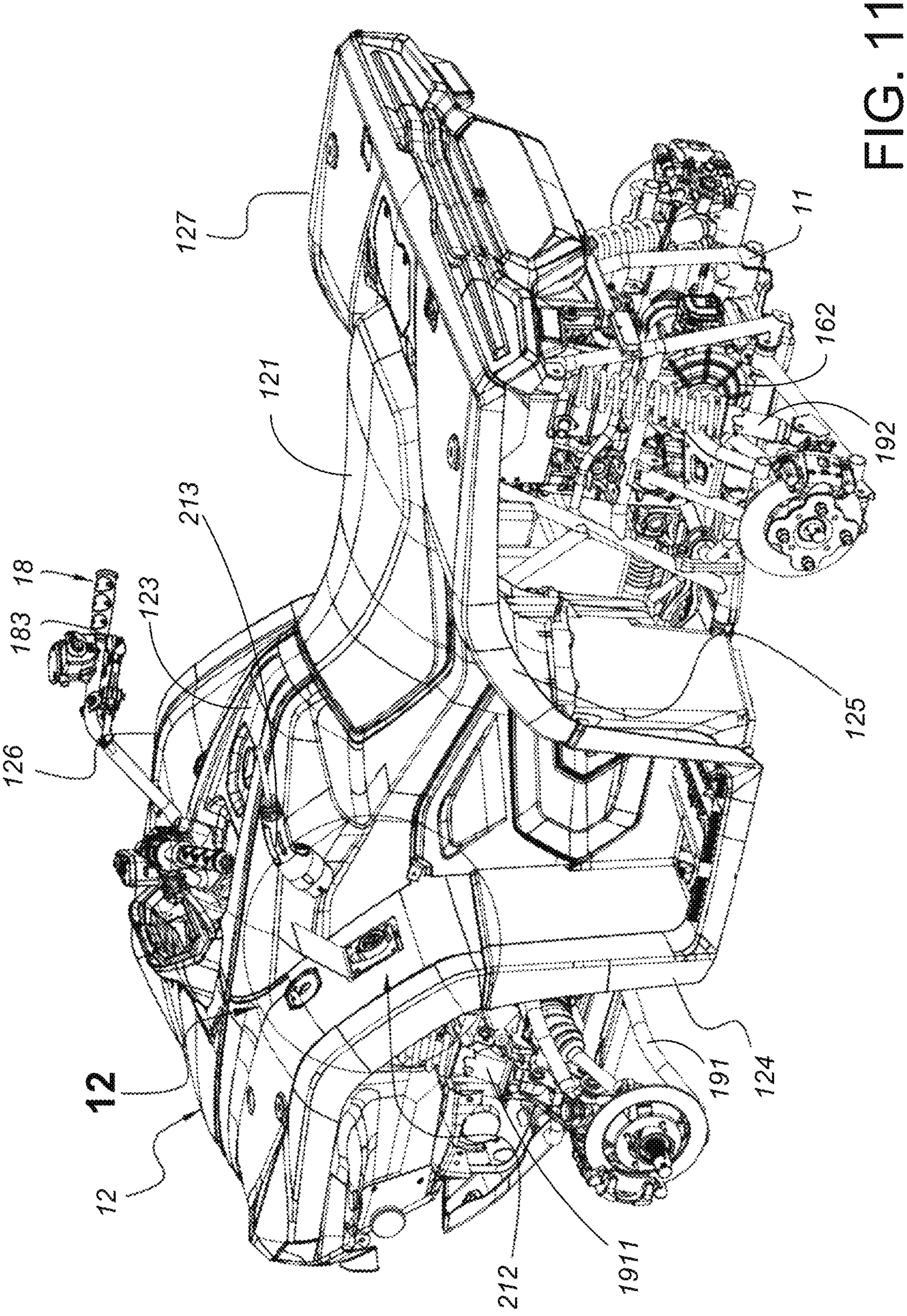
FIG. 11 is a rear left perspective view of the electric ATV of FIG. 1 without showing the set of wheels.

As shown in FIG. 9, the electric ATV 100 also includes a charging mechanism 21. As shown in FIG. 11, the charging mechanism 21 preferably includes an on-board charger (OBC) 211 and a charging port assembly 212, which as called out in FIG. 12 includes a DC charging port 2121 and an AC charging port 2122. Dual DC and AC dual charging ports 2121, 2122 are convenient for users to select based on charging conditions. The DC charging port 2121 can only be connected to a charging device (not shown) that provides DC power. The DC charging port 2121 allows faster charging and does not require current and voltage conversion and thus is directly electrically connected to the battery pack 17 by a DC wire harness (not shown). However, DC charging is generally expensive and DC charging stations are not widely available. The AC charging port 2122 can only be connected to an AC charging gun 213 shown in FIGS. 11 and 12 that provides AC power. The OBC 211 converts AC power transmitted through the AC charging port 2122 into DC voltage and current, so as to meet the electricity requirements of the battery pack 17 of the electric ATV 100. An AC wiring harness (not shown) electrically connects the AC charging port 2122 to the OBC 211 and a separate DC wiring harness (not shown) electrically connects the OBC 211 to the battery pack 17. Of course, only one kind of charging port may be provided on the electric ATV 100, such as only the DC charging port 2121 or only the AC charging port 2122.

The charging port assembly 212 is preferably disposed on or just behind the vehicle body cover 12, such as on a front left fender 124 of the vehicle body cover 12 to the rear of the steering assembly 18. The charging port assembly 212 can be detachably secured to the vehicle body cover 12 or the frame 11 by fasteners, allowing for removal and/or replacement of the charging port assembly 212 should it become damaged.

Alternative embodiments place the charging port assembly 212 on or just behind the front right fender 125, the rear left fender 126 or the rear right fender 127, or in a central mid location at the position of the fuel tank of a traditional fuel-type motorcycle or all-terrain vehicle. By locating the charging port assembly 212 similarly to prior fuel tank inlets, drivers and passengers can easily find the charging location and adapt without need to change their usage habits. In side view, the charging port assembly 212 and the battery pack 17 at least partially overlap, allowing for short wiring harness lengths.

Figure 12:
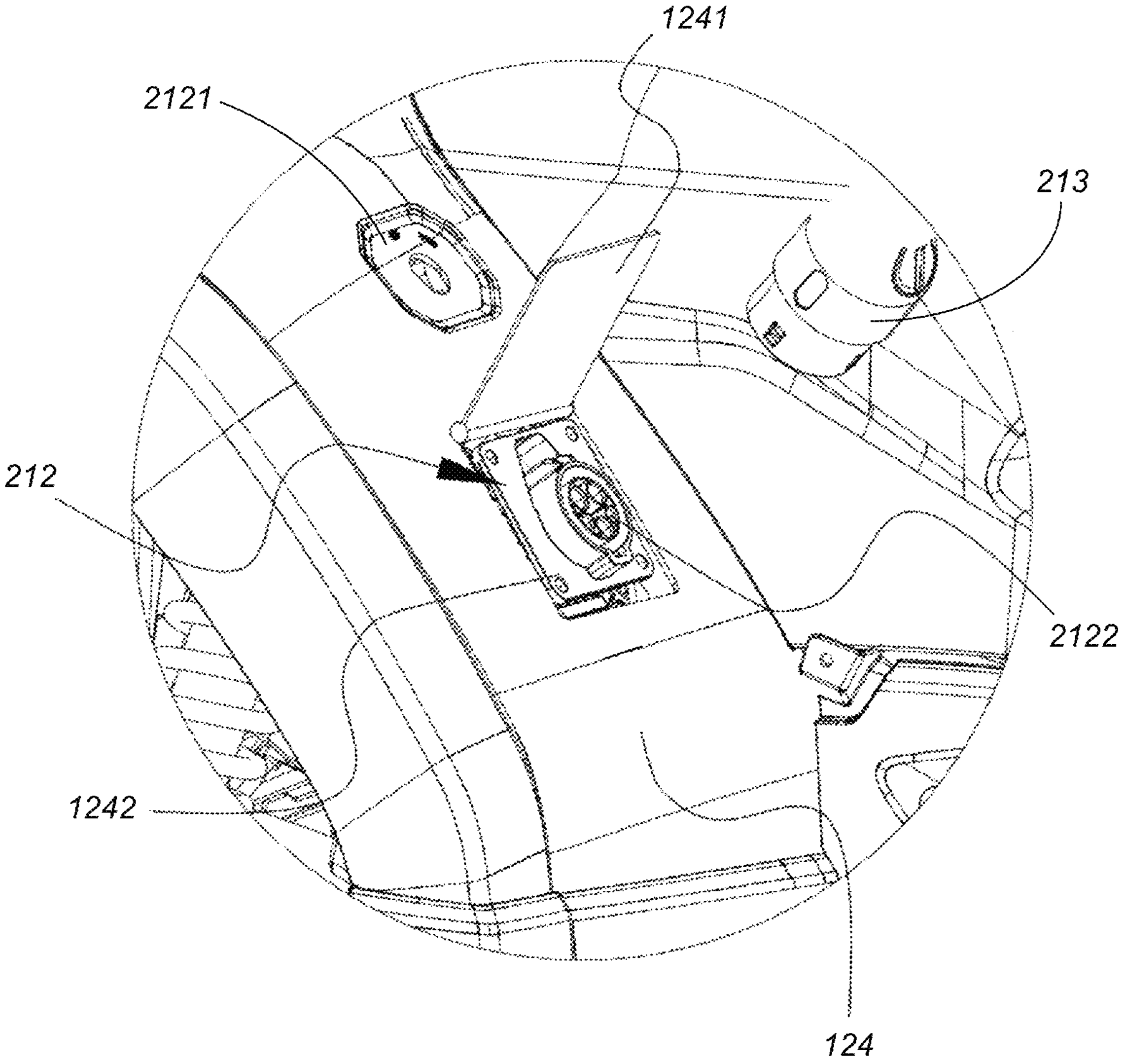
FIG. 12 is an enlargement of portion 12 of FIG. 11.
Figure 13:
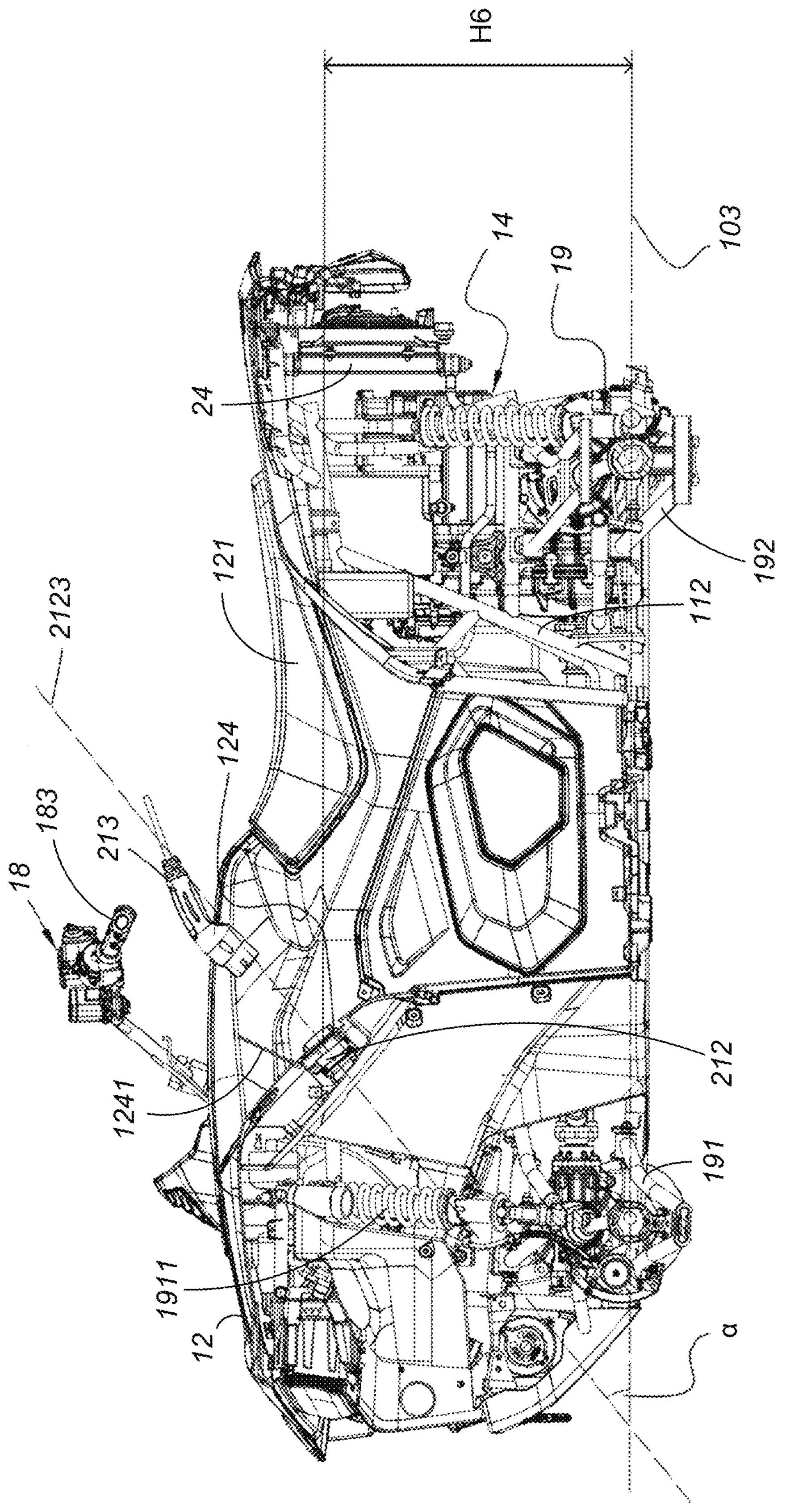
FIG. 13 is a left side view of the electric ATV of FIG. 1 without showing the set of wheels, with the vehicle cover in cross-section through the left fenders.

The front left fender 124 is provided with a charging port cover 1241 as called out in FIGS. 12 and 13 and a sealing member or rubber O-ring 1242 as called out only in FIG. 12. The sealing member 1242 surrounds the circumference the AC charging port 2122 of the charging port assembly 212. The charging port cover 1241 hinges between an open state shown in FIGS. 11-13 and a closed state. The charging port cover 1241 can be kept closed when the charging gun 213 and the AC charging port 2122 is not in use, protecting the AC charging port 2122. The sealing member 1242 engages against a back/bottom side of the charging port cover 1241 when closed for protecting the AC charging port 2122, so as to avoid water accumulation at the charging port assembly 212 during precipitation of during wading driving, thereby avoid causing potential safety hazards. In the closed state, the outer surface of the charging port cover 1241 transitions smoothly with the front left fender 124, such that the vehicle body cover 12 forms a substantially smooth and aesthetically appealing outer surface of the electric ATV 100.

The AC charging port 2122 includes a cavity defining a charging axis 2123 as shown in FIG. 13. A charging axis angle α defined between the charging axis 2123 and the wheel axis plane 103 is preferably in the range from about 150 to about 65°, more preferably greater than or equal to 30° and less than or equal to 50°, and most preferably 40°. This value for charging axis angle α helps strengthen the connection between the charging gun 213 and the AC charging port 2122 under the action of the charging gun's own weight, helping to prevent the charging gun 213 from being disengaged from the AC charging port 2122 due to accidental contact by external force and possibly preventing safety accidents. Placement of the charging port assembly 212 on one of the fenders 124, 125, 126 or 127 facilitates meeting the desired value for charging axis angle α. Alternatively or in addition, in order to further ensure safety during the charging process, a locking member (not shown) can also be provided on the charging port assembly 212 such as on the opened charging port cover 1241. The locking member can prevent the charging gun 213 from falling off due to a false touch when the charging gun 213 is received in the AC charging port 2122.

As called out in FIG. 13, a charging port height H6 between the charging port assembly 212 and the wheel axis plane 103 is preferably in the range from 600 to 900 mm, more preferably greater than or equal to 650 mm and less than or equal to 850 mm, and most preferably greater than or equal to 700 mm and less than or equal to 800 mm. The desired values for charging port height H6 realize good mechanical performance and make the best charging experience for drivers and/or passengers in line with man-machine engineering, providing a most comfortable and labor-saving charging position for most drivers and passengers.

The electric ATV 100 preferably also includes a low voltage battery 22 as shown in FIGS. 2, 3 and 9. The low voltage battery 22 stores electricity at a lower output voltage than the battery pack 17. The low voltage battery 22 is used for powering electrical components, particularly when the motor 141 is in a non-starting state. The low voltage battery 22 is preferably electrically connected to the battery pack 17 through a DC-DC voltage converter 221 (called out in FIGS. 2 and 9), which is preferably mounted next to or on the OBC 211 as part of a battery control set. If desired, the battery control set can also include a controller cooling device (not shown) for water cooling of the OBC 211 and the DC-DC voltage converter 221. The DC-DC voltage converter 221 converts high-voltage electricity output by the battery pack 17 into low-voltage electricity. The low voltage battery 22 is preferably disposed at the front end of the electric ATV 100, such as by fixing the low voltage battery 22 to the front frame assembly 111 at the front end of the steering assembly 18 in front of the handlebars 183. This location allows short electrical cables between the battery pack 17, the DC-DC voltage converter 221 and the low voltage battery 22. In front view, the OBC 211 and/or the DC-DC voltage converter 221 (i.e., at least part of the battery control set) at least partially overlaps with the battery pack 17 and with the steering assembly 18.

The front differential 161 and the rear differential 162 of the drive train 16 are well shown in FIG. 3 and the drive shaft 163 is best shown in FIG. 4. The front differential 161 is disposed on the front frame assembly 111, and the rear differential 162 is disposed on the rear frame assembly 112. The drive system 14 is disposed on the rear frame assembly 112, and torque is transmitted from the drive system 14 to the front differential 161 via rotation of the drive shaft 163. In plan view, the drive shaft 163 and the battery pack 17 at least partially overlap. To accommodate for the desired position and layout of the drive train 16 in the preferred embodiments, the battery pack 17 is supported well above the frame base 110, such as 50 mm or more, by stand-offs 1101 called out in FIGS. 3 and 4. The battery pack 17 is preferably bolted to each of the stand-offs 1101 via a vertically-extending bolt (not shown). For instance, the battery standoff height H5 between the lowest end of the battery pack 17 and the wheel axis plane 103 is ideally in the range from 90 mm to 100 mm. Alternatively, an accommodating space for the drive shaft 163 can be provided at the lower end of the battery pack by changing the shape of the bottom of the battery pack. Another alternative splits the battery pack into right and left parts positioned on right and left sides of the drive shaft.

Figure 14:
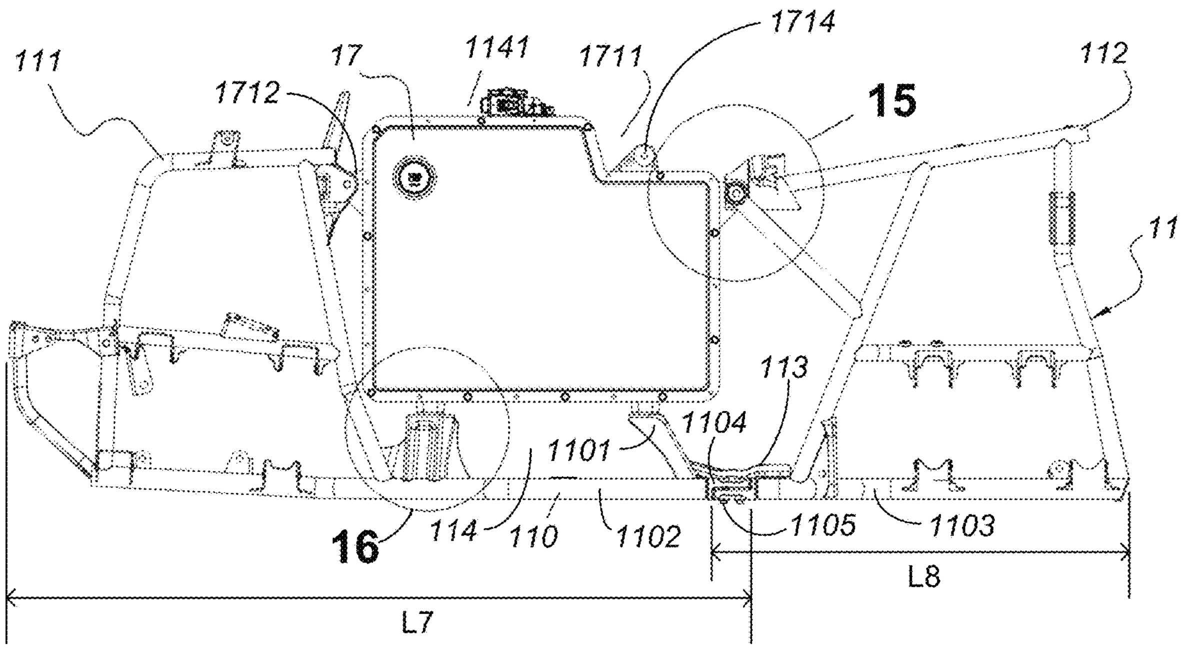
FIG. 14 is a left side view of the battery pack and primary frame portions of the electric ATV of FIG. 1.
Figure 16:
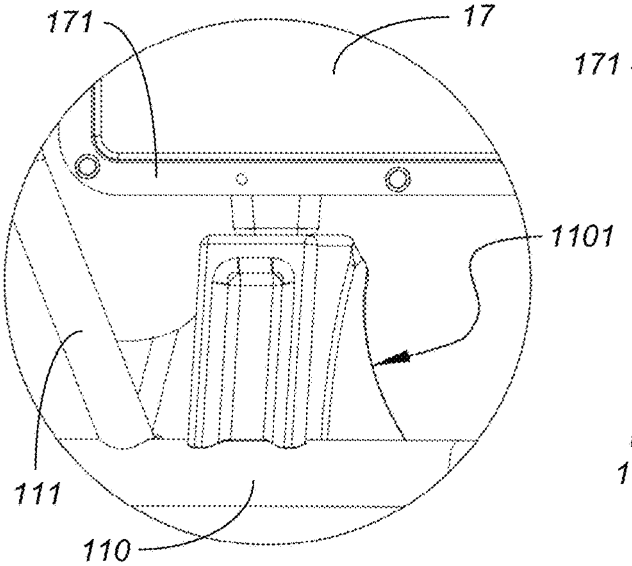
FIG. 16 is an enlargement of portion 16 of FIG. 14.
Figure 15:
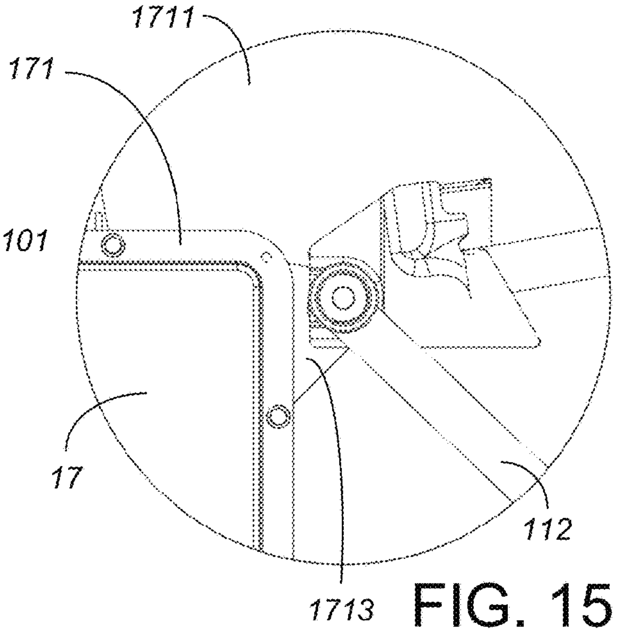
FIG. 15 is an enlargement of portion 15 of FIG. 14.

As called out in FIG. 14, the frame 11 defines a battery pack receiving area 114 longitudinally behind the front frame assembly 111 and in front of the rear frame assembly 112, with the battery pack 17 received in the battery pack receiving area 114. The battery pack receiving area 114 includes a top span 1141 where the front frame assembly 111 is separated from the rear frame assembly 112 above the base 110. The battery pack 17 is detachably connected to the front frame assembly 111 at one or more top front locations such as at top front support ears 1712 of the battery case 171, and is detachably connected to the rear frame assembly 112 at one or more top rear locations such as at top rear support ears 1713 of the battery case 171. Transversely extending bolts (not shown) can be used to detachably secure the support ears 1712, 1713 to the frame 11. The battery pack 17 thus extends across the top span 1141, with the battery case 171 able to provide support forces between the front frame assembly 111 and the rear frame assembly 112 and resist bending of the base 110 of the frame 11. In other words, the battery case 171 is a load-bearing battery case which bears the longitudinal load of the frame 11 in the top span 1141. The top front support ears 1712 and the top rear support ears 1713 are at an elevation which is at or near the top of the battery pack 17, thereby better withstanding loads on the upper end of the frame 11. The stand-offs 1101 also provide detachable connections to the battery case 171. Detachable connections can facilitate the installation and disassembly between the battery case 171 and the frame 11, and enhance the flexibility of assembling the battery case 171 on the frame 11. In an alternative embodiment, the stand-offs 1101 can be integrally formed or welded to the load-bearing battery case 171, and be detachably connected to the base 110 of the frame 11. The preferred stand-offs 1101 are parts stamped and bent from sheet metal and then welded to tubes of the base 110, with high strength against deformation when the electric ATV 100 is driven on extreme terrain, which can better protect the battery pack 17.

In some alternative embodiments of the electric ATV, the base of the frame is formed by continuous tubes that extend substantially the entire length of the frame. In such embodiments, the front frame assembly 111 and the rear frame assembly 112 can be formed and assembled and then welded to the base tubes, so the entire frame is integrally constructed with permanent connections. More preferably, the base 110 of the frame 11 includes front base tubes 1102 which are separate from rear base tubes 1103 as called out in FIG. 14 and further shown in FIG. 17. The front base tubes 1102 can be welded to the assembled front frame assembly 111, and the rear base tubes 1103 can be welded to the assembled rear frame assembly 112. The front base tubes 1102 have attachment flanges 1104 at their rear ends, and the rear base tubes 1103 have attachment flanges 1105 at their front ends, and the attachment flanges 1104, 1105 allow the front base tubes 1102 to be detachably secured to the rear base tubes 1103 such as by bolts 1106. The length of the battery case 171 from the top front support ears 1712 to the top rear support ears 1713 is then specifically designed to match the top span 1141 of the frame 11 when the respective attachment flanges 1104, 1105 are bolted together.

It may be desirable for a vehicle manufacturer to offer a model line of electric ATVs with two or more different battery pack lengths for different consumers. For such model lines, it is beneficial to devise a frame which can accommodate different battery pack lengths by changing the wheelbase distance of the frame, but otherwise keeping the front frame portion and the rear frame portion substantially unchanged. Additionally, battery technology changes quickly, and it may be beneficial for some vehicle manufacturers to permit a change in battery pack lengths for different model years. The preferred embodiment has a frame design intended to easily allow modification for different wheelbase distances for accommodating different lengths of battery packs.

Specifically, either or both sets of attachment flanges 1104, 1105 can be formed with a telescoping connection relative to their associated base frame tubes 1102, 1103, so the longitudinal position of the attachment flanges 1104, 1105 can be changed relative to either the position of the front frame assembly 111 or the position of the rear frame assembly 112, thereby allowing adjustment of the length of the top span 1141 and adjustment of the wheelbase distance L2. Having an adjustable length of top span 1141 allows the volume of the battery pack accommodation area 114 to be changed, so that the electric ATV 100 can be adapted to battery packs of different capacities and internal components of different configurations.

Figure 17:
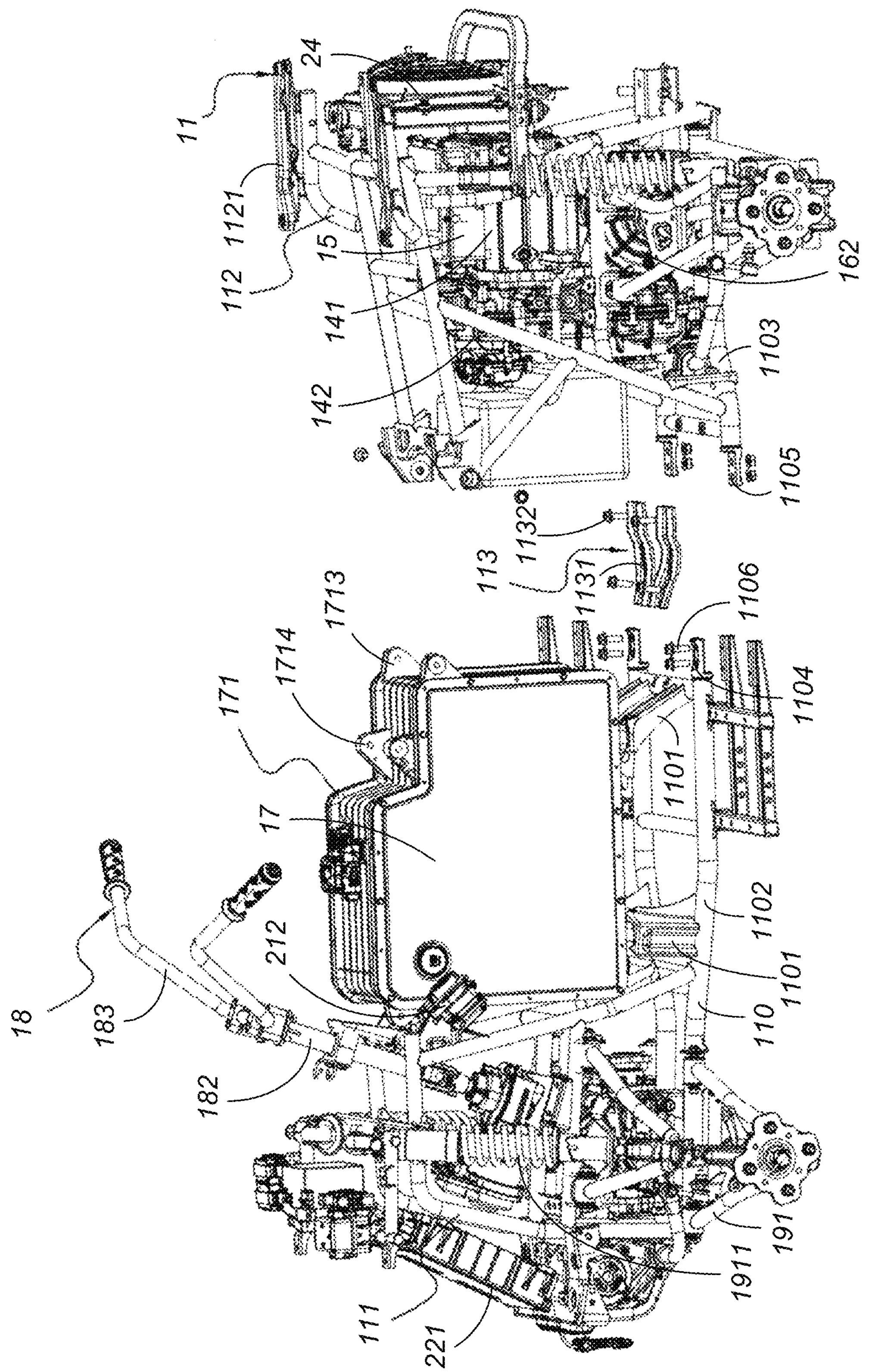
FIG. 17 is an exploded left perspective view of the electric ATV of FIG. 1 without showing the showing the vehicle cover, the set of wheels, or the drive shaft.
Figure 18:
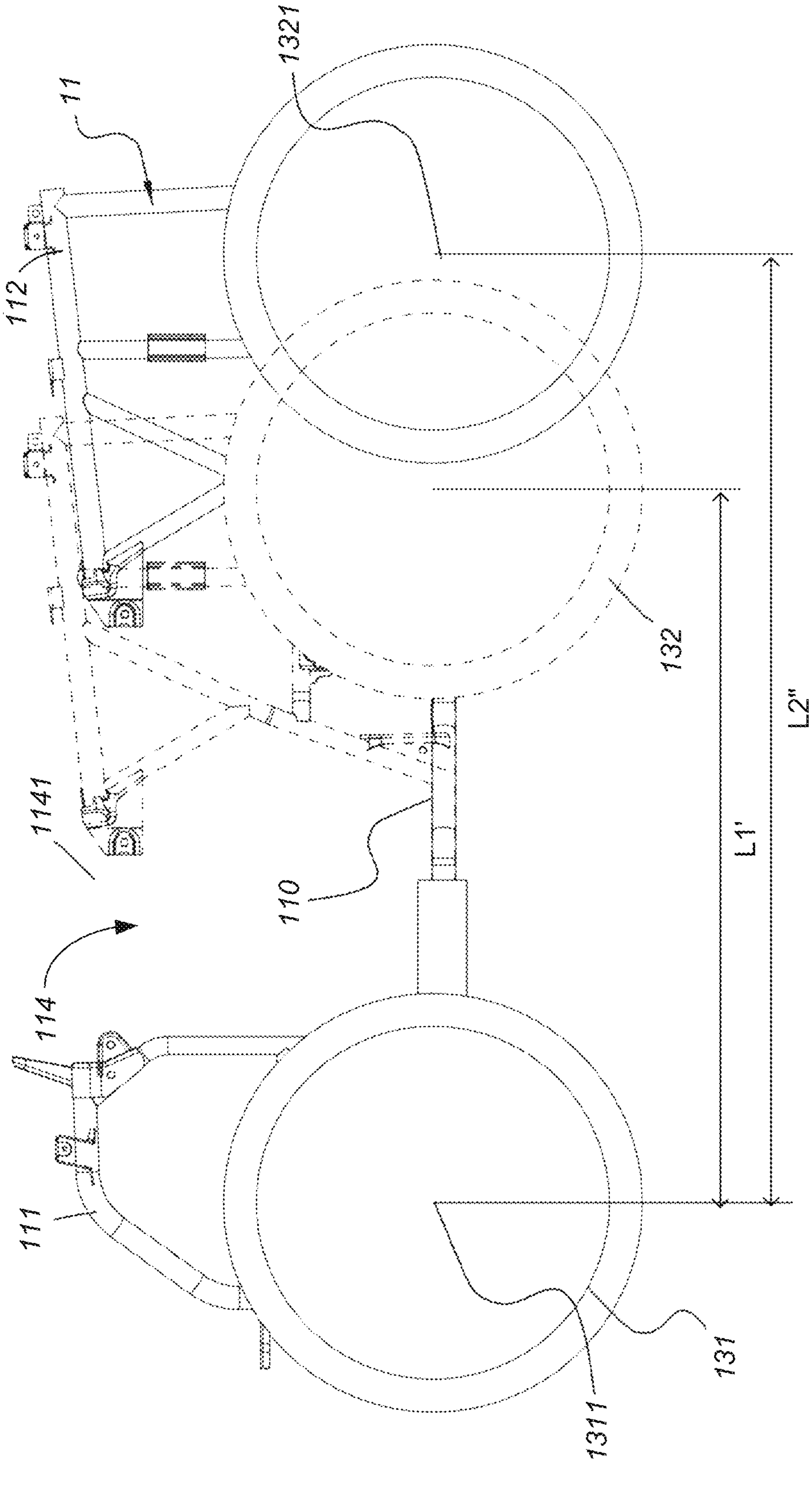
FIG. 18 is a left side view of a simplified and slightly modified version the frame which can be used in the electric ATV of FIG. 1, schematically showing the wheels and showing the longest (in solid lines) and shortest (in dashed lines) available wheelbase distances.
Figure 19:
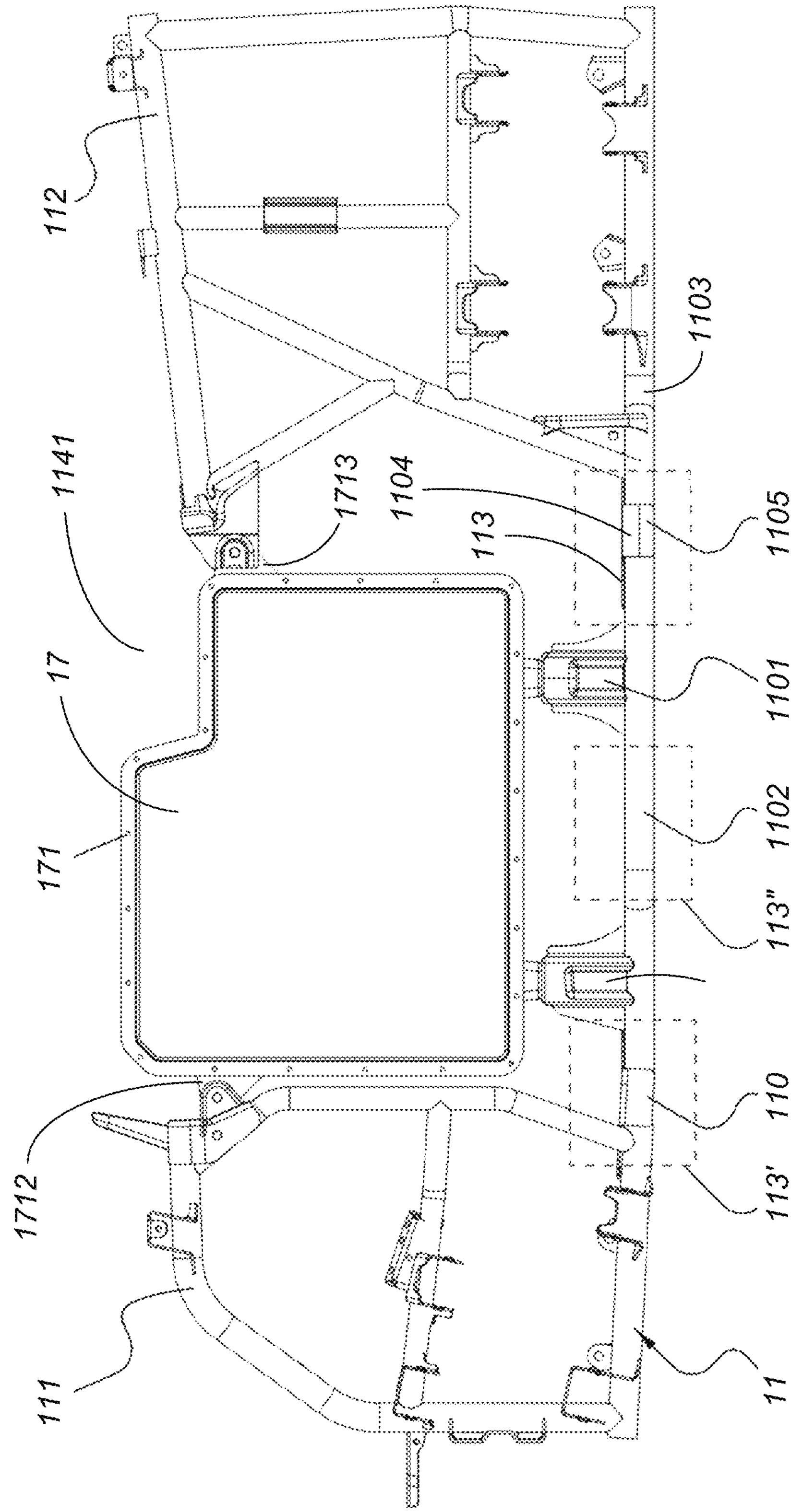
FIG. 19 is a left side view of the frame of FIG. 18 around a simplified battery pack.

As shown in FIGS. 17 through 19, one or more frame connecting members 113 are then used to set the length of the top span 1141 between the front frame assembly 111 and the rear frame assembly 112. The preferred frame connecting members 113 shown in FIG. 17 include longitudinally extending slots 1131 for bolts 1132, so the frame connecting members 113 can be bolted to the front frame assembly 111 and to the rear frame assembly 112 anywhere within a range of longitudinal positions. The top span length between the front frame assembly 111 and the rear frame assembly 112 can be changed by loosening the bolts 1132 or disconnecting the frame connecting members 113 and adjusting the telescoping of the attachment flanges 1104, 1105, thereby changing the wheelbase distance L2 before retightening the frame connecting members 113.

By have a frame construction that allows changing of the wheelbase distance L2 and changing of the length of the top span 1141 as explained with reference to FIG. 18, the front frame assembly 111 can be set anywhere within a range from a first (shortest wheelbase distance) extreme position L2' and a second (longest wheelbase distance) extreme position L2" relative to the rear frame assembly 112. A wheelbase adjustment ratio L2'/L2" of the shortest wheelbase distance L2' to longest wheelbase distance L2" is preferably in the range from 0.65 to 0.9, more preferably in the range from 0.7 to 0.8. This range of wheel base adjustment ratios L2'/L2" permits sufficient flexibility for top span 1141 while not having the telescoping connection overly reduce support strength of the base 110 of the frame 11.

In terms of process flow, components can be assembled onto the front frame assembly 111 separately and at the same time as other components are assembled onto the rear frame assembly 112, thereby improving assembly efficiency. More importantly, the adjustable length frame 11 of the present invention can also effectively reduce design and manufacturing costs and increase the universality of the frame 11.

In the preferred embodiment, the frame connecting members 113 are positioned at the rear edge of the battery pack 17. The battery pack 17 is fixedly connected to the front frame assembly 111, while the motor 141 is fixedly connected to the rear frame assembly 112. As shown in FIG. 14, a maximum longitudinal length occupied by the front frame assembly 111 including the front base tubes 1102 is defined as a front frame length L7, and a maximum longitudinal length occupied by the rear frame assembly 112 including the rear base tubes 1103 is defined as a rear frame length L8. The frame length ratio L7/L8 of the front frame length L7 to the rear frame length L8 is preferably in the range from 1.3 to 2.3, more preferably in the range from 1.5 to 2.1, and most preferably in the range from 1.67 to 2.0. By choosing a suitable frame length ratio L7/L8, the positions of main electrical components can be reasonably allocated between the front frame assembly 111 and the rear frame assembly 112.

While the preferred embodiment locates the frame connecting members 113 at the rear end of the battery pack 17, other embodiments select alternative locations for frame connecting members. FIG. 19 shows two alternative positions for the frame connecting members, including a forward position 113' in front of the battery pack 17 and a middle position 113" between the stand-offs 1101 for the battery pack 17. Another alternative embodiment uses frame connecting members both at the forward position 113' and at the rearward position 113, with the base tubes 110 split into three sections (not shown) and with the stand-offs 1101 for the battery pack 17 welded onto central tube portions of the base 110.

Figure 20:
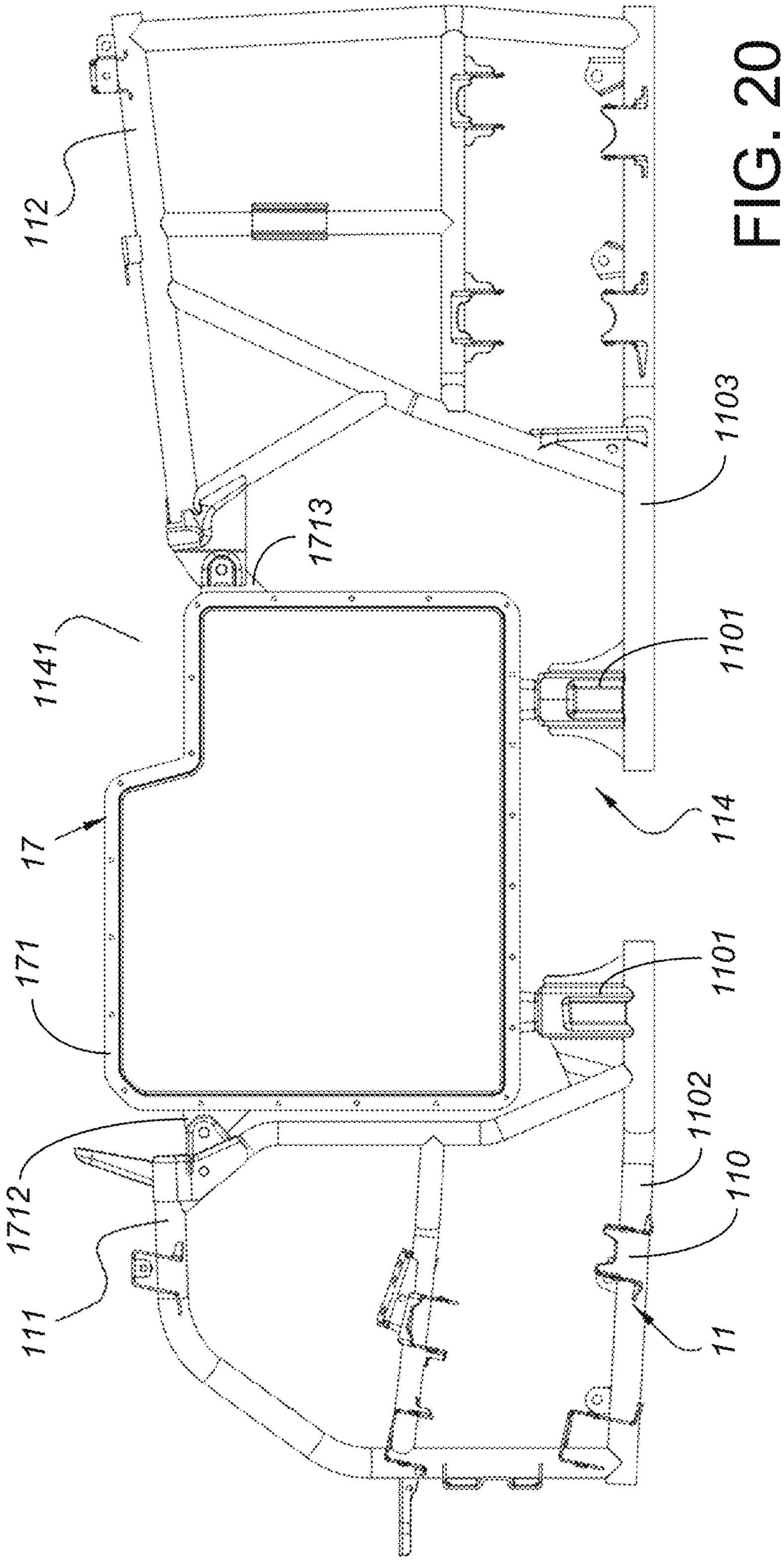
FIG. 20 is a left side view of another alternative frame around the battery pack of FIG. 19.

Another alternative embodiment shown in FIG. 20 has no base of the frame extending longitudinally under the full length of the battery pack 17. The embodiment of FIG. 20 uses the battery case 171 for the entire connection between the front frame assembly 111 and the rear frame assembly 112. Vehicle model changes to new lengths of battery packs require no changes whatsoever to this frame design of FIG. 20.

Yet another alternative embodiment omits the frame connecting members 113 and telescoping attachment flanges 1104, 1105 in favor a three base tube design with sets of fixed attachment flanges (not shown) both in front of the standoffs 1101 and behind the standoffs 1101. Central tube portions (not shown) of the base 110 supporting the standoffs 1101 have their length selected to correspond to the desired top span, battery pack length and wheelbase length, such that only the central tube portions can be changed when the vehicle model changes to a new length of battery pack.

All of these adjustable-frame-length embodiments effectively reduce the accuracy requirements for assembly errors between the frame 11 and the battery pack 17, reduce assembly costs and manufacturing costs, and enable the battery pack 17 to be stably connected to the frame 11.

As noted, the battery case 171 in the preferred embodiments bears significant forces during driving of the electric ATV 100 over harsh terrains, and strength requirements of the battery case 171 are relatively high. The preferred battery case 171 is made of metal, with a most preferred construction being cast aluminum in order to balance the relationship between the rigidity and light weight of the battery case 171.

The electric ATV 100 includes at least one storage compartment so as to enhance the transportation functions of the electric ATV 100. However, adding storage squeezes the layout space of the electric ATV 100 for other components such as the battery pack 17 or the MCU 15.

Preferably at least some of the storage is disposed on the upper end of the electric ATV 100, which avoids the greater likelihood of damage toward the bottom of the ATV 100. Accordingly, the preferred embodiment includes the above-battery-pack storage box 123 as shown in FIGS. 1-3, 9, 11 and 21-23. In the plan view of FIG. 21, projections of the battery pack 17 and of the above-battery-pack storage box 123 at least partially overlap. The above-battery-pack storage box 123 defines a top opening 1231 hingedly covered by an exterior box cover 1232. A hinge 1233 (called out in FIG. 21) for the exterior box cover 1232 is adjacent to the handlebars 183, which facilitates allowing the driver and passengers to take and place goods from and into the storage assembly 18 while seated on the vehicle 100. Alternatively, the direction of the opening and/or hinge orientation could be set to face other directions, or a flip cover, screw cover or other type of cover could be used according to actual needs.

Figure 21:
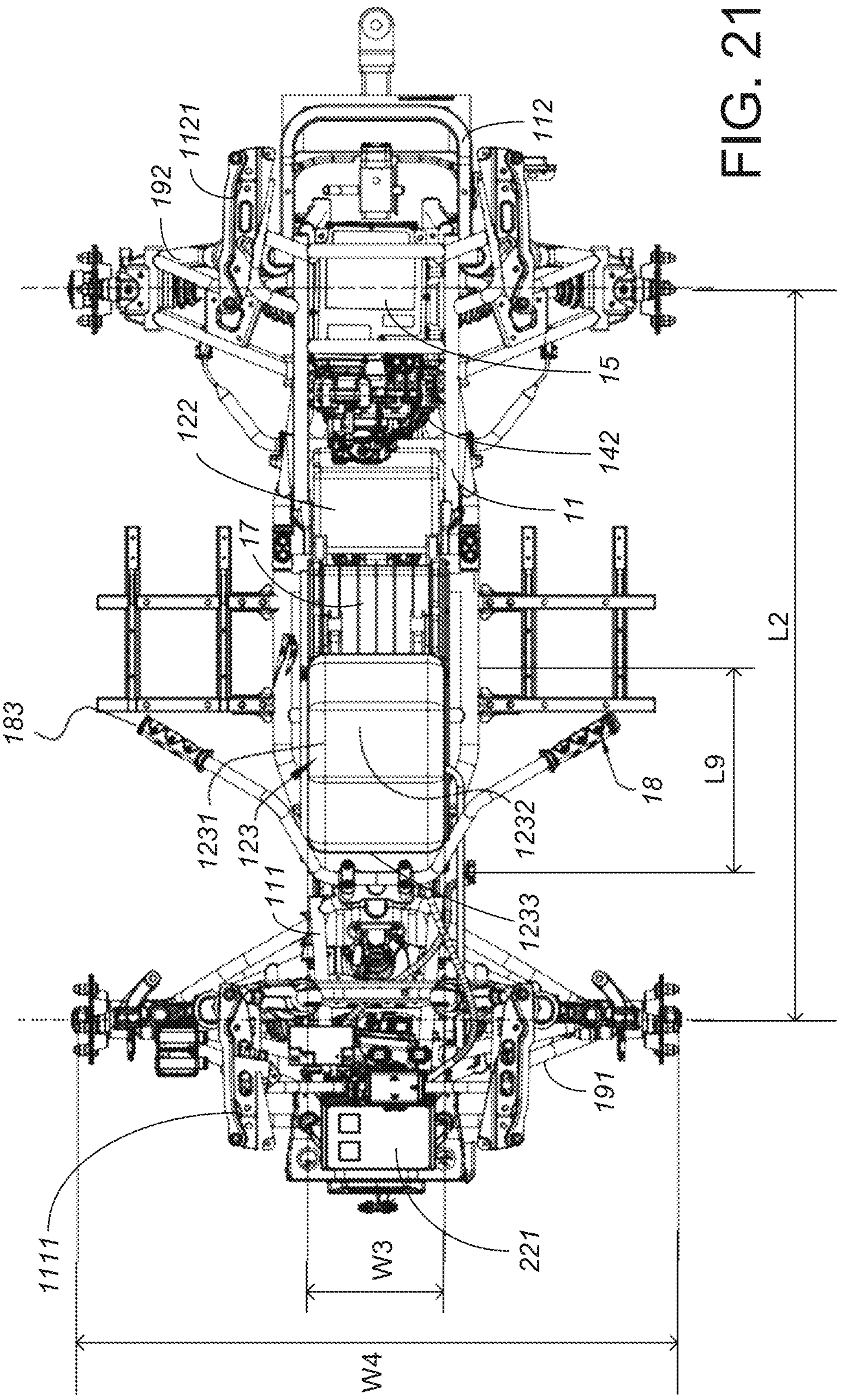
FIG. 21 is a top plan view of the vehicle portions shown in FIG. 9 except removing the seat.

The above-battery-pack storage box 123 has a maximum storage length L9 called out in FIGS. 9 and 21. A storage length ratio L9/L2 between the maximum storage length L9 and the wheelbase distance L2 is in the preferably range from 0.15 to 0.4, more preferably in the range from 0.2 to 0.35, and most preferably in the range from 0.25 to 0.3. The above-battery-pack storage box 123 has a maximum storage width W3. The maximum storage width W3 can be compared against a vehicle track width W4 as shown in FIG. 21. A storage width ratio W3/W4 between the maximum storage width W3 and the vehicle track width W4 is preferably in the range from 0.15 to 0.25, and more preferably in the range from 0.18 to 0.22. When the electric ATV 100 is a straddle-type all-terrain vehicle, these storage length and storage width ratio ranges can keep the above-battery-pack storage box 123 from interfering with the setting of the driver's driving area, which facilitates the setting of the shape of the vehicle, and at the same time can obtain a larger storage space to the greatest extent. As called out in FIG. 9, a storage elevation H7 of the bottom of the above-battery-pack storage box 123 over the wheel axis plane 103 is preferably in the range from 230 mm to 560 mm, more preferably in the range from 280 mm to 510 mm, and most preferably in the range from 330 mm to 460 mm. These ranges of values of storage elevation H7 leave sufficient space for arranging the battery pack 17 or other electronic components.

The above-battery-pack storage box 123 is preferably provided as a plastic part attached to the vehicle body cover 12 and firmly connected with the frame 11. Using detachable connections between the above-battery-pack storage box 123 and both the vehicle body cover 12 and the frame 11 allows for removal and replacement of the above-battery-pack storage box 123 if desired. Alternatively, the above-battery-pack storage box 123 can be integrally formed as part of the vehicle body cover 12. The exterior box cover 1232 is in profile with the rest of the vehicle body cover 12 forming an aesthetically appealing outer surface of electric ATV 100.

Figure 22:
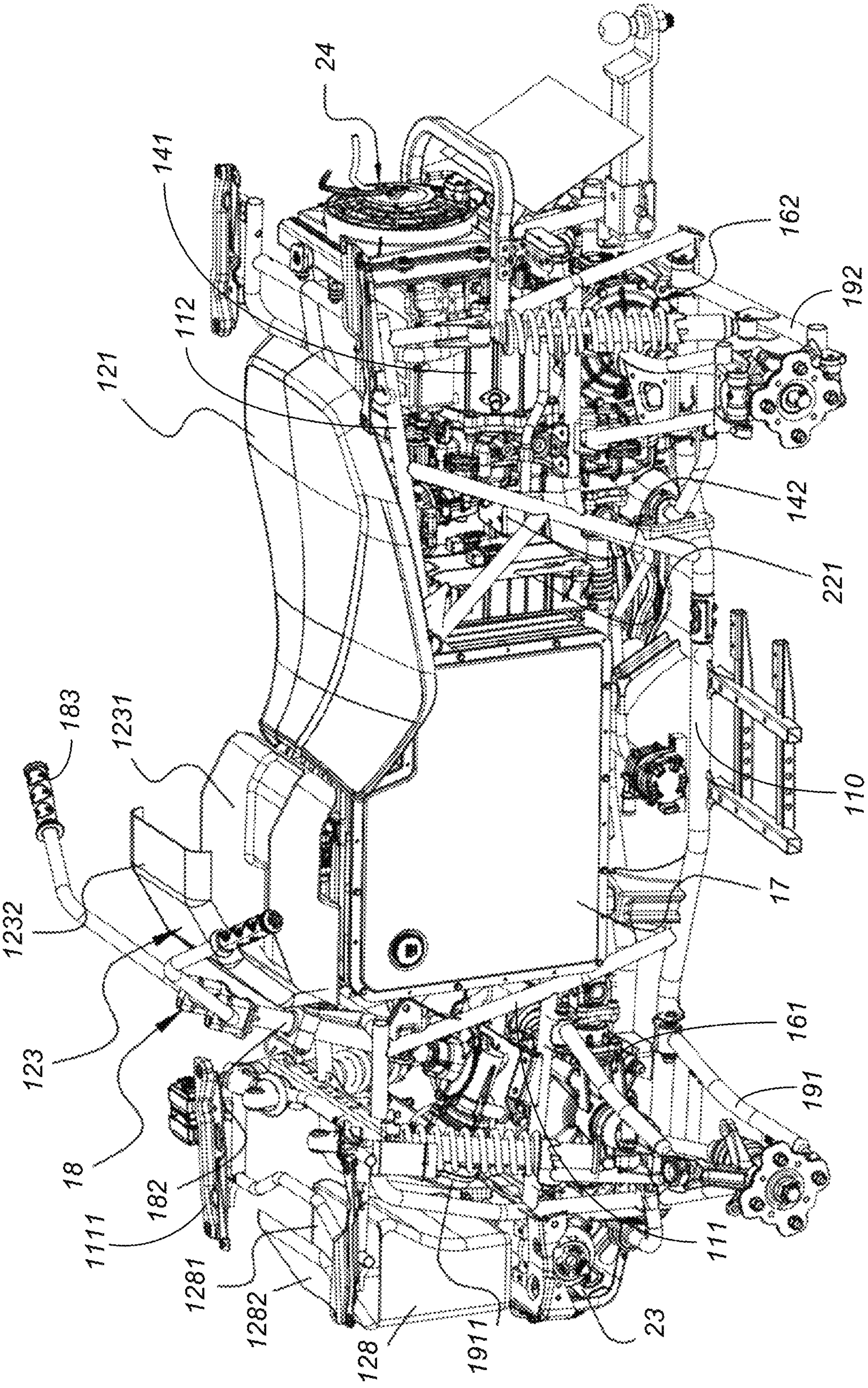
FIG. 22 is a left perspective view of an alternative storage and OBC layout using the frame and remaining components of FIGS. 2 and 3.

FIG. 22 shows an embodiment that uses a front storage box 128. The front storage box 128 is mounted on the front frame assembly 111, such as on a front auxiliary frame 1111 of the front frame assembly 111 in front of the handlebars 183. For instance, the electric ATV 100 preferably includes a winch 23 mounted on the front frame assembly 111, and the front storage box 128 mounted above the upper end of the winch 23. In plan view, the winch 23 and the front storage box 128 at least partially overlap. The front storage box 128 preferably defines a front storage box opening 1281 removably covered with a front storage box lid 1282, such as hinged at its front side to allow pivoting of the front storage box lid 1282 and access to the interior of the front storage box 128.

Figure 23:
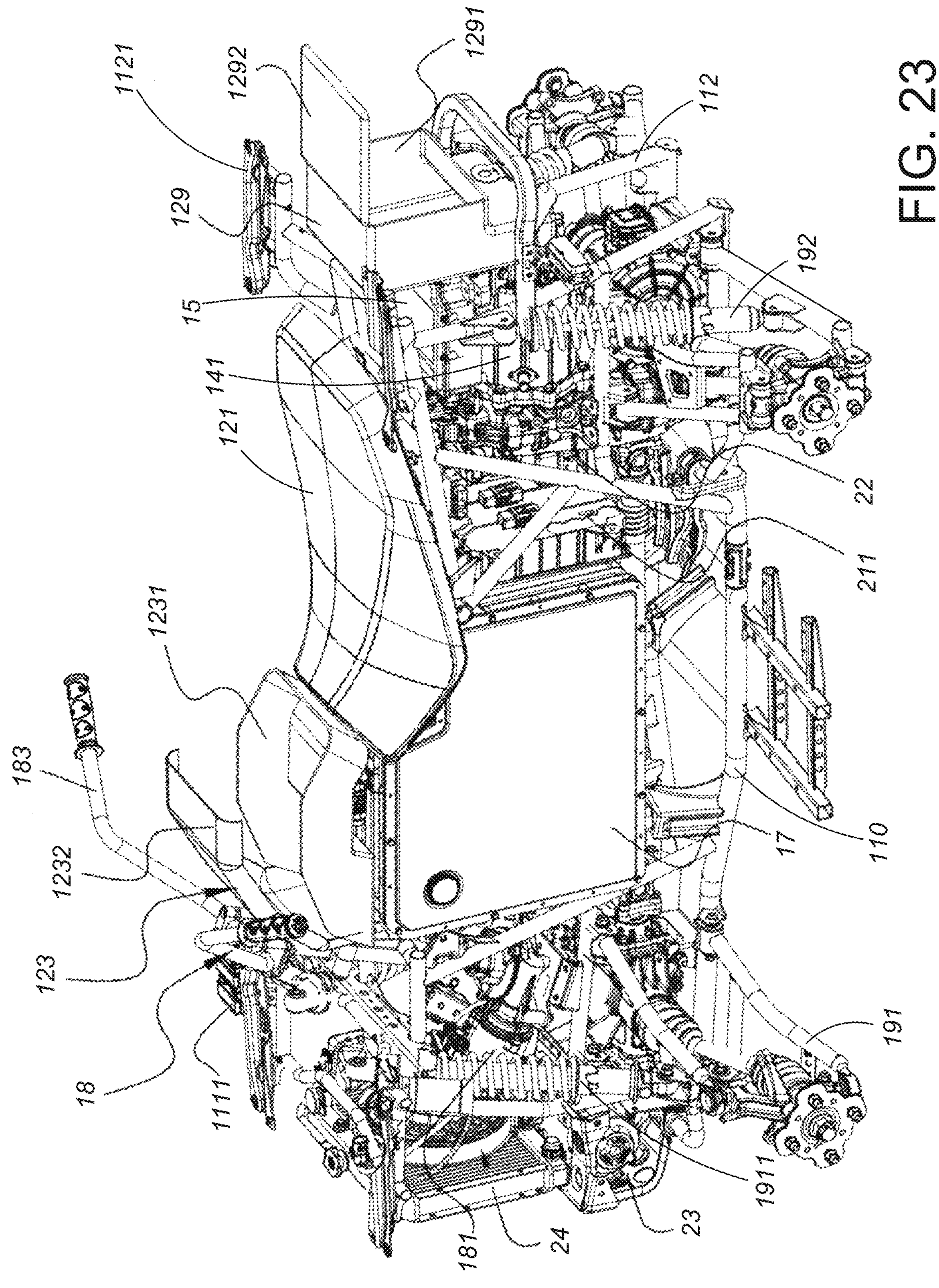
FIG. 23 is a left perspective view of another alternative storage and radiator layout using the frame and remaining components of FIGS. 2 and 3.

FIG. 23 shows another embodiment, that uses a rear storage box 129 instead of the front storage box 128 of FIG. 22. The rear storage box 129 is integrally formed with or fixedly connected to the vehicle body cover 12, and is disposed at the rear of the electric ATV 100 behind the motor 141. The rear storage box 129 has an opening 1291 disposed toward the rear end of the electric ATV 100. A rear storage box cover 1292 is hingedly connected as part of the vehicle body cover 12. The rear storage box cover 1292 is preferably hinged at the top of the rear storage box 129 so as to extend vertically when in the closed position. The electric ATV 100 includes a rear auxiliary frame 1121 above the rear storage box 129, which can be used as a platform to support external storage equipment or bundled goods without affecting the opening and closing of the rear storage box cover 1292, thereby further expanding the storage space.

The electric ATV 100 also includes radiator 24. When the front storage box 128 is disposed on the front end of the electric ATV 100, the radiator 24 is preferably disposed at the rear end of the electric ATV 100, and the low voltage battery 22 and the battery control set can be similarly disposed at the rear end of the electric ATV. When the rear storage box 129 is disposed on the rear end of the electric ATV 100, the radiator 24 is preferably disposed at the front end of the electric ATV 100. Another embodiment (not shown) uses the front storage box 128 together with the rear storage box 129 but omits the under-seat storage box 123, and the battery control set and the low voltage battery 22 are disposed at the rear end of the battery pack 17 and below the seat cushion 121.

Figure 24:
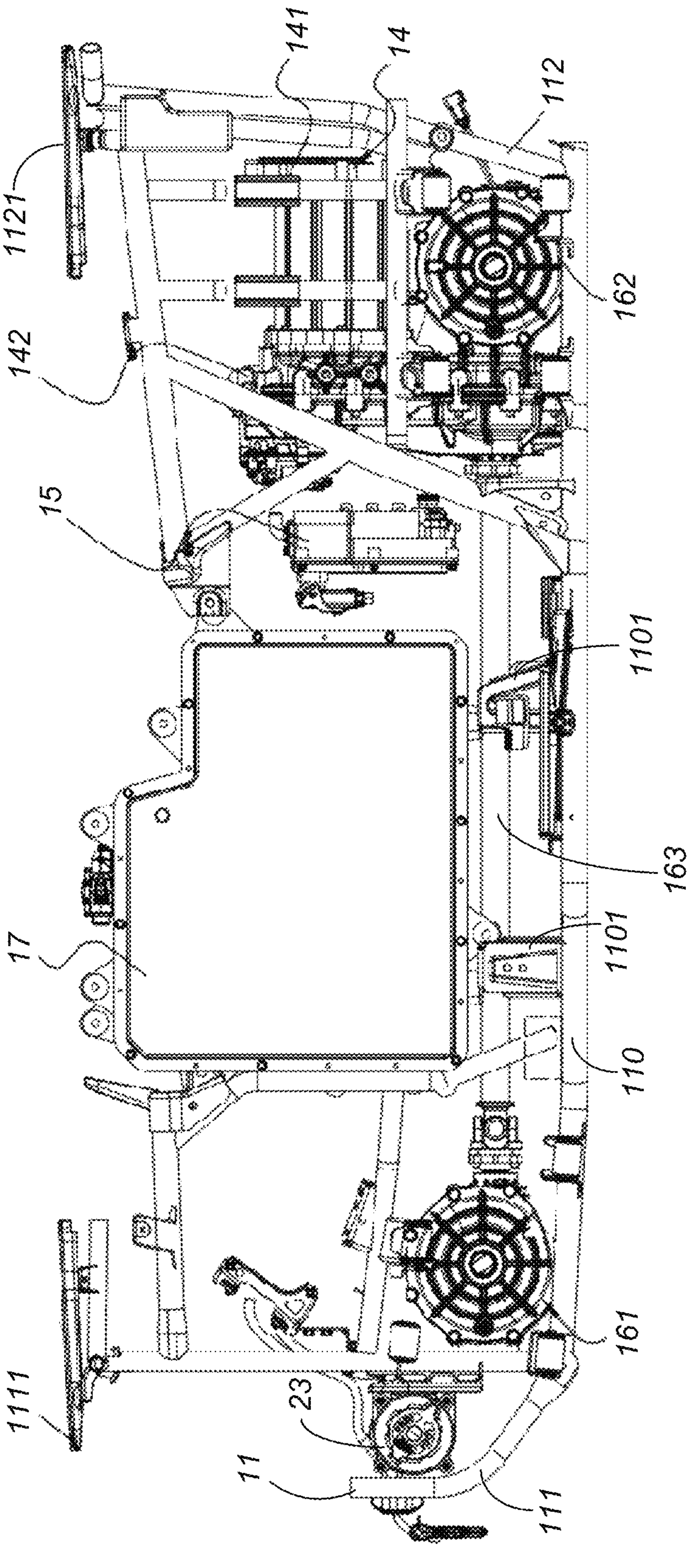
FIG. 24 is a left side view similar to FIG. 4 but using an alternative Tri-core system layout, a slightly different battery pack case and not showing the suspension.

FIG. 24 shows a side view of an alternative embodiment in which the MCU 15 is positioned between the electric motor 141 and the battery pack 17, such that from front to rear, the battery pack 17, the MCU 15, and the electric motor 141 are mounted in sequence. The gearbox assembly 142 is at least partially positioned between the electric motor 141 and the MCU 15. The MCU 15 is rotated relative to its orientation in the embodiments of FIGS. 2-23, such that the MCU 15 is mounted with its shortest side length extending in the longitudinal direction. When the MCU 15 is positioned between the electric motor 141 and the battery pack 17, reorienting the MCU 15 shortens the length of the Tri-core system projection area. Furthermore, the battery pack 17 and the MCU 15 are positioned longitudinally between the front differential 161 and the rear differential 162, and the electric motor 141 is at least partially placed above the rear differential 162. This achieves a relatively short length of the Tri-core system projection area, but also fully utilizes the vehicle space, thereby making the ATV more compact as a whole. The MCU could alternatively be located rearward of the electric motor, such that the electric motor is between the MCU and the battery pack. The MCU 15 may be fixedly connected directly to the frame 11. For the embodiment of FIG. 24, another alternative is to fixedly connect the MCU 15 directly to the battery pack 17. The relatively large height and width of the battery pack 17 provides the possibility for the direct fixation of the MCU 15 thereto. In an electric ATV with a shorter battery pack, the MCU 15 may alternatively be at least partially mounted on the upper end of battery pack 17.

In the description of this application, "fixed connection" is defined as a non-pivotable connection, that is, two parts that are fixedly connected cannot undergo relative displacement or relative rotation in the connected state.

It should be understood that the specific embodiments described here are only used to illustrate the invention, not to limit it. According to the embodiments provided in the present application, all other embodiments obtained by persons of ordinary skill in the art without creative work shall fall within the scope of protection of the present application. The drawings represent only some examples or embodiments of the present application, and those skilled in the art can also apply the present invention to other similar situations according to these drawings without adding creative work. In addition, it should be noted that although the work done in development of any vehicle may be complicated and lengthy, for those of ordinary skill in the art, the concepts taught herein can be applied to other vehicle designs using only conventional technical means. The above-mentioned embodiments only represent several embodiments of the present invention, and the descriptions thereof are relatively specific and detailed, but should not be construed as a limitation to the scope. Workers of ordinary skill in the art may make numerous modifications and improvements without departing from the concepts of the present invention. Therefore, the protection scope of the patent of the present invention is defined to include the full breadth of the appended claims.

The invention claimed is:

1. An electric all-terrain vehicle, comprising:
- a frame;
- a vehicle body cover covering at least part of the frame, the vehicle body cover comprising a straddle seat;
- a drive system comprising a motor supported by the frame;
- a battery pack disposed on the frame for providing energy for the motor for locomotion of the electric all-terrain vehicle, the battery pack having a battery pack center of gravity;
- a set of wheels supporting the frame, the set of wheels including front wheels defining a front wheel axis and rear wheels defining a rear wheel axis, with a transverse mid-plane being defined half way between the front wheel axis and the rear wheel axis;
- a drive train for delivering torque from the motor to the set of wheels, the drive train having a front differential, a rear differential, and a drive shaft at least partially disposed between the front differential and the rear differential;

wherein the drive shaft is at least partially disposed under the battery pack such that the drive shaft and the battery pack at least partially overlap in plan view, and wherein a battery pack offset distance between the battery pack center of gravity and the transverse mid-plane is less than or equal to 300 mm.

2. The electric all-terrain vehicle of claim 1, wherein a distance between the front wheel axis and the rear wheel axis is a wheelbase distance, wherein a maximum longitudinal length of the battery pack is a battery pack length, and wherein a battery pack length ratio of the battery pack length to the wheelbase distance is in the range from 0.1 to 0.6.

3. The electric all-terrain vehicle of claim 1, wherein a wheel axis plane contains the front wheel axis and the rear wheel axis, and wherein a distance between a lowest end of the battery pack and the wheel axis plane is in the range from 90 mm to 370 mm.

4. The electric all-terrain vehicle of claim 1, wherein the battery pack comprises a battery case and at least one battery module disposed inside the battery case; wherein the frame includes a front frame assembly and a rear frame assembly cooperatively defining a battery pack receiving area with a top span between the front frame assembly and the rear frame assembly, with the battery pack at least partially disposed in the battery pack receiving area, and with the battery case being capable of providing a support force between the front frame assembly and the rear frame assembly across the top span.

5. The electric all-terrain vehicle of claim 4, wherein the battery case comprises:
- at least one top front support ear bolted to the front frame assembly; and
- at least one top rear support ear bolted to the rear frame assembly.

6. The electric all-terrain vehicle of claim 4, wherein the frame comprises a base with at least one stand-off supporting the battery case above the base.

7. The electric all-terrain vehicle of claim 1, wherein a wheel axis plane contains the front wheel axis and the rear wheel axis, and wherein the electric all-terrain vehicle further comprises a charging port assembly defining a charging axis at a charging axis angle with the wheel axis plane in the range from 15° to 65°, and wherein a charging port height between the charging port assembly and the wheel axis plane is in the range from 700 mm to 800 mm.

8. An electric all-terrain vehicle, comprising:
- a frame defining a longitudinal mid-plane perpendicular to a left-right direction of the vehicle;
- a vehicle body cover covering at least part of the frame, the vehicle body cover comprising a straddle seat;

a drive system comprising a motor supported by the frame;

a battery pack disposed on the frame for providing energy for the motor for locomotion of the electric all-terrain vehicle;

a set of wheels supporting the frame, the set of wheels including front wheels and rear wheels;

a drive train for delivering torque from the motor to the set of wheels, the drive train having a front differential, a rear differential, and a drive shaft at least partially disposed between the front differential and the rear differential;

wherein the drive shaft is at least partially disposed under the battery pack such that the drive shaft and the battery pack at least partially overlap in plan view, wherein a left battery edge distance between a leftmost end of the battery pack and the longitudinal mid-plane is in the range from 30 mm to 165 mm, and wherein a right battery edge distance between a rightmost end of the battery pack and the longitudinal mid-plane is in the range from 30 mm to 165 mm.

9. The electric all-terrain vehicle of claim 8, wherein a battery edge ratio of the left battery edge distance to the right battery edge distance is greater than or equal to 0.8 and less than or equal to 1.25.

10. An electric all-terrain vehicle, comprising:

a frame comprising a front frame assembly and a rear frame assembly, with a battery pack receiving area defined between the front frame assembly and the rear frame assembly;

a vehicle body cover covering at least part of the frame, the vehicle body cover comprising a straddle seat;

a drive system comprising a motor supported by the rear frame assembly;

a battery pack disposed on the frame for providing energy for the motor for locomotion of the electric all-terrain vehicle, the battery pack being supported by the frame in the battery pack receiving area, the battery pack having a battery pack center of gravity;

a set of wheels supporting the frame, the set of wheels including front wheels defining a front wheel axis and rear wheels defining a rear wheel axis, with a transverse mid-plane being defined half way between the front wheel axis and the rear wheel axis;

a drive train for delivering torque from the motor to the set of wheels, the drive train having a front differential, a rear differential, and a drive shaft at least partially disposed between the front differential and the rear differential;

wherein a battery pack offset distance between the battery pack center of gravity and the transverse mid-plane is less than or equal to 300 mm.

11. The electric all-terrain vehicle of claim 10, wherein a distance between the front wheel axis and the rear wheel axis is a wheelbase distance, wherein a maximum longitudinal length of the battery pack is a battery pack length, and wherein a battery pack length ratio of the battery pack length to the wheelbase distance is in the range from 0.1 to 0.6.

12. The electric all-terrain vehicle of claim 10, wherein the frame defines a longitudinal mid-plane perpendicular to a left-right direction of the vehicle, wherein a left battery edge distance between a leftmost end of the battery pack and the longitudinal mid-plane is in the range from 60 mm to 150 mm, and wherein a right battery edge distance between a rightmost end of the battery pack and the longitudinal mid-plane is in the range from 60 mm to 150 mm.

13. The electric all-terrain vehicle of claim 12, wherein a battery edge ratio of the left battery edge distance to the right battery edge distance is in the range from 0.8 to 1.25.

14. The electric all-terrain vehicle of claim 10, wherein the drive shaft is at least partially disposed under the battery pack such that the drive shaft and the battery pack at least partially overlap in plan view.

15. The electric all-terrain vehicle of claim 10, wherein a maximum longitudinal length occupied by the front frame assembly is a front frame assembly length, a maximum longitudinal length occupied by the rear frame assembly is a rear frame assembly length, and a frame length ratio of the front frame assembly length to the rear frame assembly length is in the range from 1.5 to 2.1.

16. The electric all-terrain vehicle of claim 10, wherein the battery pack receiving area has a top span between the front frame assembly and the rear frame assembly, wherein the frame includes at least one frame connecting member used to set a length of the top span between the front frame assembly and the rear frame assembly.

17. The electric all-terrain vehicle of claim 16, wherein the at least one frame connecting member includes at least one longitudinally extending slot for a bolted connection to the front frame assembly and to the rear frame assembly anywhere within a range of longitudinal positions.

18. The electric all-terrain vehicle of claim 10, wherein a wheelbase distance is defined between the front wheel axis and the rear wheel axis, wherein the frame allows changing of the wheelbase distance within a range from a shortest wheelbase distance to a longest wheelbase distance, with a wheelbase adjustment ratio of the shortest wheelbase distance to the longest wheelbase distance being in a range from 0.7 to 0.8.

19. The electric all-terrain vehicle of claim 10, further comprising a steering assembly and an above-battery-pack storage box disposed at least partially behind the steering assembly and at least partially above the battery pack such that the battery pack and the above-battery-pack storage box at least partially overlap in plan view.

20. The electric all-terrain vehicle of claim 19, further comprising:

an underseat storage box at least partially disposed behind the battery pack and in front of the drive system; and a radiator supported by the rear frame assembly behind the drive system.

* * * * *